(12) United States Patent
Pickett et al.

(10) Patent No.: US 7,761,334 B2
(45) Date of Patent: *Jul. 20, 2010

(54) METHOD AND SYSTEM FOR AUTOMATED TRACING OF AN AGRICULTURAL PRODUCT

(75) Inventors: Terence Daniel Pickett, Waukee, IA (US); Frederick William Nelson, Waukee, IA (US); Stephen Michael Faivre, Kingston, IL (US); Andy Dwayne Beck, Urbandale, IA (US); Georg Larscheid, Einoed (DE); Mark Steven Sommer, East Moline, IL (US); Thomas Kent Wagner, Ankeny, IA (US)

(73) Assignee: Deere & Company, Moline, IL (US)

( * ) Notice: Subject to any disclaimer, the term of this patent is extended or adjusted under 35 U.S.C. 154(b) by 960 days.

This patent is subject to a terminal disclaimer.

(21) Appl. No.: 10/327,228

(22) Filed: Dec. 20, 2002

(65) Prior Publication Data

US 2003/0182144 A1    Sep. 25, 2003

Related U.S. Application Data

(60) Provisional application No. 60/366,181, filed on Mar. 20, 2002.

(51) Int. Cl.
*G06Q 10/00* (2006.01)
(52) U.S. Cl. .............................. 705/23; 702/2; 706/904; 73/863

(58) Field of Classification Search ................... 705/1; 702/2; 706/904; 73/863
See application file for complete search history.

(56) References Cited

U.S. PATENT DOCUMENTS

| 5,478,990 | A | 12/1995 | Montanari et al. ........... 235/375 |
| 5,845,229 | A | 12/1998 | Rawlins .......................... 702/2 |
| 6,119,531 | A | * 9/2000 | Wendte et al. ............ 73/863.52 |
| 6,211,789 | B1 | 4/2001 | Oldham et al. ........... 340/573.3 |
| 6,231,435 | B1 | 5/2001 | Pilger ......................... 452/157 |

(Continued)

FOREIGN PATENT DOCUMENTS

FR    2 776 790 A1    10/1999

(Continued)

OTHER PUBLICATIONS

Heidi Reichert and Kimberly Vachal, *Identity Preserved grain. Logistical Overview* (Jan. 2000).

*Primary Examiner*—Janice A. Mooneyham
*Assistant Examiner*—Heidi Riviere

(57) ABSTRACT

Crop information related to a particular crop is collected and stored in data storage during the performance of an agricultural operation. A harvested particular crop is segregated from all other genetically distinct crops by storing the particular harvested crops in one or more segregated storage volumes for storing the particular crop. Each segregated storage volume has a corresponding storage identifier. An electronically accessible data profile, associated with the particular crop, is provided or made available to a user. The data profile includes the collected crop information.

36 Claims, 26 Drawing Sheets

U.S. PATENT DOCUMENTS

| | | | |
|---|---|---|---|
| 6,327,569 B1 | 12/2001 | Reep | 705/1 |
| 6,329,920 B1 | 12/2001 | Morrison et al. | 340/573.3 |
| 6,342,839 B1 | 1/2002 | Curkendall et al. | 340/573.3 |
| 6,346,885 B1 | 2/2002 | Curkendall | 340/572.4 |
| 6,385,544 B1 | 5/2002 | Mafra-Neto | 702/5 |
| 6,671,698 B2 | 12/2003 | Pickett et al. | 707/104.1 |
| 6,691,135 B2 | 2/2004 | Pickett et al. | 707/104.1 |
| 2001/0011437 A1 | 8/2001 | Shortridge et al. | 47/58.1 |
| 2001/0029996 A1 | 10/2001 | Robinson | 141/11 |
| 2002/0012934 A1 | 1/2002 | Meghen et al. | 435/6 |
| 2002/0032497 A1 | 3/2002 | Jorgenson et al. | 700/115 |
| 2002/0082982 A1 | 6/2002 | Mock et al. | 705/37 |
| 2002/0091593 A1 | 7/2002 | Fowler | 705/28 |
| 2002/0095232 A1 | 7/2002 | Jorgenson et al. | 700/99 |
| 2003/0033224 A1 | 2/2003 | Ludwig et al. | 705/28 |
| 2004/0024782 A1 | 2/2004 | Chamberlain | 707/104.1 |

FOREIGN PATENT DOCUMENTS

| | | |
|---|---|---|
| FR | 2 813 683 A1 | 3/2002 |
| FR | 2 836 257 | 8/2003 |
| WO | WO 00/48454 | 8/2000 |
| WO | WO 01/93036 A1 | 12/2001 |
| WO | WO 02/13594 A1 | 2/2002 |
| WO | WO 02/37375 A1 | 5/2002 |
| WO | WO 03/058404 A2 | 7/2003 |

* cited by examiner

| PLANTING INFORMATION | | | | | | |
|---|---|---|---|---|---|---|
| FARM FIELD TASK | CROP SOURCE VARIETY | LOAD NUMBER | LOAD DATE TIME | LOT NUMBER | QUANTITY LOADED | CHEMICAL APPLICATION |
| VIRTUAL FARMS INC. NORTH FIELD SPRING PLANTING | CORN PIONEER 34H98 | 80201 | 25Apr01 4:18 PM | 123456 | 10 BAGS | PESTICIDE BASF 1234 |
| VIRTUAL FARMS INC. NORTH FIELD SPRING PLANTING | CORN PIONEER 34H98 | 80202 | 25Apr01 4:48PM | 123456 | 10 BAGS | PESTICIDE BASF 1234 |

Fig. 13

| FARM FIELD TASK | CROP | HARVEST INFORMATION | | | | MACHINE SETTINGS | | | FARM CONTAINER IDENTIFIER |
|---|---|---|---|---|---|---|---|---|---|
| | | UNLOAD DATE TIME | YIELD | MOISTURE | DAMAGE | GRD SPEED | ROTOR SPEED | FAN SPEED | |
| VIRTUAL FARMS INC. NORTH FIELD FALL HARVEST | CORN | 10Nov01 10:46AM | 152 BU/A | 28% | 1% CRACK/ SPLITS | X MPH | XXX RPM | XXX RPM | 470-2465 |
| VIRTUAL FARMS INC. NORTH FIELD FALL HARVEST | CORN | 10Nov01 11:12AM | 144 BU/A | 29% | 1% CRACK/ SPLITS | X MPH | XXX RPM | XXX RPM | 470-2465 |
| VIRTUAL FARMS INC. NORTH FIELD FALL HARVEST | CORN | 10Nov01 11:26AM | 149 BU/A | 28% | 1% CRACK/ SPLITS | X MPH | XXX RPM | XXX RPM | 470-6115 |

Fig. 14

| FARM CONTAINER IDENTIFIER | PROCESSING INFORMATION | | | | | | |
|---|---|---|---|---|---|---|---|
| | SOURCE | DATE TIME IN | PROCESS 1 | PROCESS 2 | PROCESS 3 | DATE TIME OUT | PROCESSOR CONTAINER IDENTIFIER |
| 470-2465 | VIRTUAL FARMS INC. NORTH FIELD | 12Dec01 11:21AM | DRY TO 15% | CLEAN TO <1% MOG | GRIND TO MEAL | 12Dec01 4:01PM | ABC-4624 |
| 470-2465 | VIRTUAL FARMS INC. NORTH FIELD | 12Dec01 11:21AM | DRY TO 15% | CLEAN TO <1% MOG | GRIND TO MEAL | 12Dec01 8:14PM | ABC-6735 |

Fig. 16

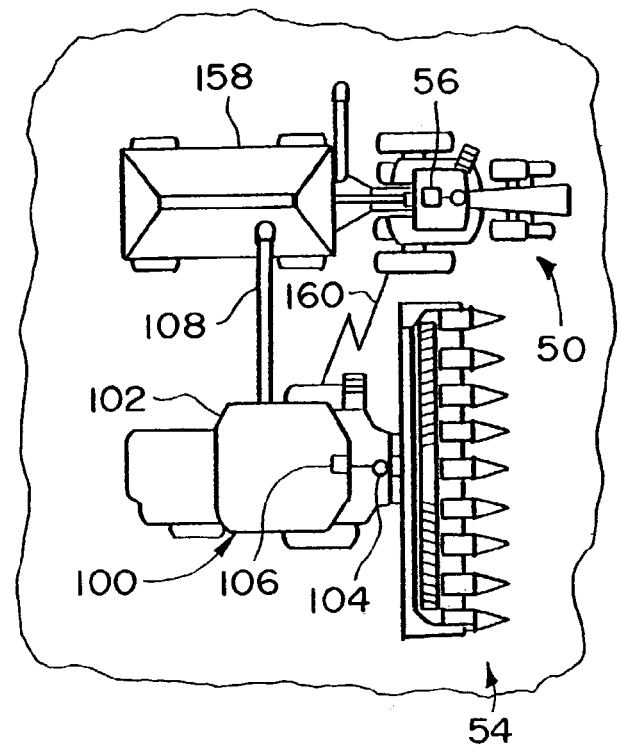
Fig. 23
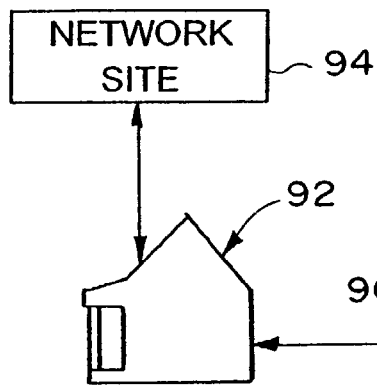
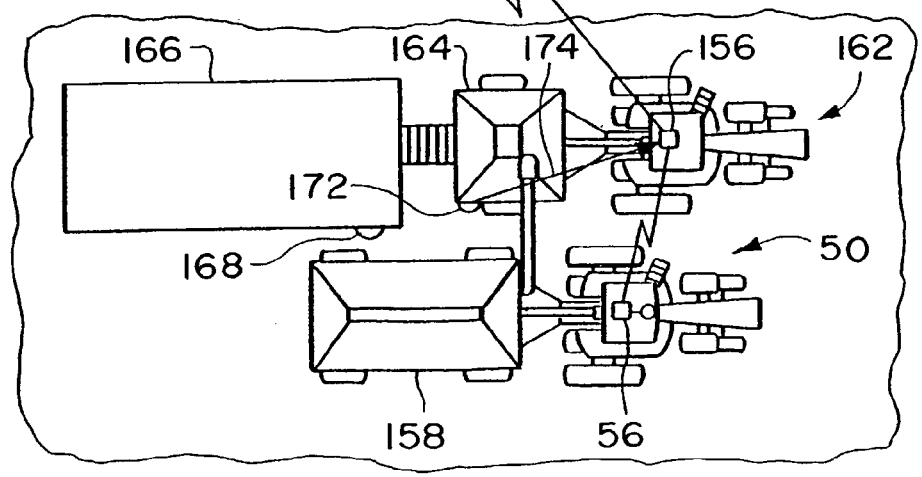
Fig. 24

METHOD AND SYSTEM FOR AUTOMATED TRACING OF AN AGRICULTURAL PRODUCT

This document claims priority based on U.S. provisional application Ser. No. 60/366,181, filed Mar. 20, 2002, and entitled METHOD AND SYSTEM FOR AUTOMATED TRACING OF A CROP, under 35 U.S.C. 119(e).

FIELD OF THE INVENTION

The present invention relates to a method and system for automated tracing of a crop or an agricultural product.

BACKGROUND OF THE INVENTION

Current crop production, transportation and handling systems are largely based on a bulk commodity or any other fixed or mobile container for holding a crop or agricultural product approach. Harvesting machines, such as combines, are used to harvest crops and also to separate the crop (i.e. grain, beans, seeds, or the like) from the remainder of the plant material. The crop is off-loaded from the harvesting machine into a cart, truck trailer, or another transportation device and transported to a farm storage facility, local elevator, crop processor, or another destination. At the farm storage facility, the crop may be dried and stored in a bin for later use or transport from the farm. At the local elevator, the crop may be dried, cleaned, and stored, for example. The crop is later transported by any available mode of conveyance (e.g., truck, rail or barge) to a subsequent destination, such as a crop processor (e.g., a flour mill) or to a terminal elevator for further transport.

The bulk commodity system is highly efficient at moving large quantities of agricultural commodities or generally ubiquitous crops. One drawback of the bulk commodity approach is the limited ability to differentiate crops based on various crop characteristics. For the most part, crops are graded and classified according to a U.S. Department of Agriculture Standard (U.S.D.A.), which may be used as a board of trade classification. For example, much corn is graded as number two yellow corn and meets the minimum characteristics established by the U.S.D.A. for that classification.

However there are crop characteristics, other than those presently used by the U.S.D.A. and board of trade classifications, that crop processors and food producers seek to utilize in food or other product production processes. Recent advances in plant science have produced crops having differentiated output traits. For example, corn may be classified as high oil corn, high starch corn, waxy corn, highly fermentable corn, white corn, nutritionally-enhanced corn, pest-resistant corn (e.g., bachillus thuringensis (BT) corn, which is resistant to corn borer), herbicide-resistant or enhanced herbicide-tolerant corn (e.g., ROUNDUP READY™ corn; ROUNDUP READY is a trademark of Monsanto Company), non-genetically modified (i.e., non-GMO) corn, and genetically modified corn (i.e., GMO corn). Similarly, soybeans may be classified as high protein soybeans, high oil soybeans, large soybeans, non-genetically modified soybeans, herbicide-resistant soybeans or enhanced herbicide-resistant corn (e.g., ROUNDUP READY™ soybeans), and genetically modified soybeans.

Other crops have been developed for certain pharmaceutical or nutriceutical properties. For example, certain crops are genetically modified through biotechnology to provide therapeutic properties or medicinal compounds. While these genetically modified (GMO) crops provide benefits to producers and/or consumers, some consumers prefer to avoid food products made from genetically modified crop ingredients. In response, certain regulators (e.g., European regulators) have adopted, or are considering, regulations that require food products to be labeled to indicate the presence and/or absence of GMO ingredients. The demand to certify crops as being not genetically modified or "non-GMO" has primarily been met by manual documentation processes.

Other consumers desire food products that are produced organically. Organic crops are generally grown without exposure to certain herbicides, fertilizers, insecticides, plant hormones, or other chemicals that might otherwise be used in conventional farming techniques. Organic food production largely avoids the bulk commodity system due to small volumes and the inability to properly segregate organically produced products from non-organically produced products. Many organic crops are produced under contract and delivered from the farm directly to the processor. These crops do not travel through the bulk commodity system. With respect to organic foods, it is necessary to maintain extensive documentation to certify the crop as organically produced. Such documentation is largely gathered through time intensive manual processes.

It is necessary to gather and maintain information about differentiated crop traits to realize added value from these traits. To facilitate the large-scale production, transportation, and use of crops with differentiated characteristics, a method and system is needed to automatically gather crop data and to make the information accessible to downstream users.

SUMMARY OF THE INVENTION

In accordance with a method and system of tracing an agricultural product, crop information related to a particular crop is collected and stored in data storage during the performance of an agricultural operation. A harvested particular crop is segregated from all other genetically distinct crops by storing the particular harvested crops in one or more segregated storage volumes for storing the particular crop. Each segregated storage volume has a corresponding storage identifier. An electronically accessible data profile, associated with the particular crop, is provided or made available to a user. The data profile includes the collected crop information.

BRIEF DESCRIPTION OF THE DRAWINGS

FIG. 13 is an illustrative example of the planting information.

FIG. 14 is an example of the harvesting information.

FIG. 16 is an example of the processing information.

FIG. 23 is a plan view of a harvesting operation with a combine unloading into a grain cart.

FIG. 24 is a schematic illustration of a harvesting operation with a container being loaded from a grain cart.

DESCRIPTION OF THE PREFERRED EMBODIMENT

Figure 1:
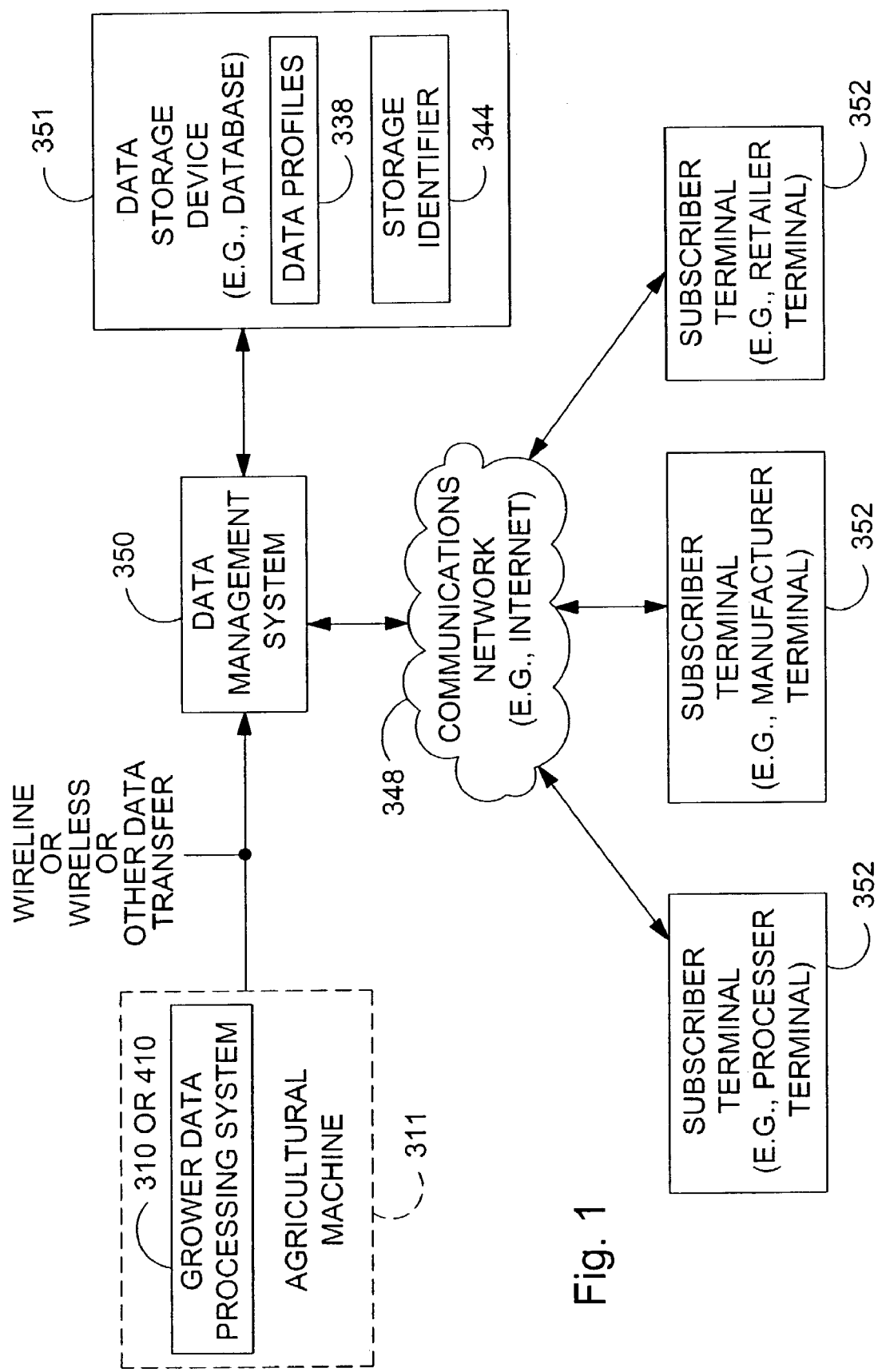
FIG. 1 is a block diagram of one embodiment of a system for tracing of an agricultural product.

An agricultural product includes, but is not limited to, a crop, a derivative of a crop, an extract from a crop, an intermediate product, and a final product. A crop may include, but is not limited to, any of the following: an organic crop, an organically grown vegetable, an organically grown fruit, number two yellow corn, high oil corn, high starch corn, waxy corn, highly fermentable corn, white corn, nutritionally-enhanced corn, pest-resistant corn, corn resistant to corn earworms, herbicide resistant corn, non-genetically modified corn, and genetically modified corn, corn with genetically altered protein content, corn with genetically altered enzyme content, high protein soybeans, high oil soybeans, large soybeans, non-genetically modified soybeans, and genetically modified soybeans, and any other crop attributes.

Crop information or crop data includes, but is not limited to, genetic data and production data on a crop or an agricultural product. Production information may include any of the following: pre-planting information, planting information, growing information, adjacent-field information, adjacent crop information, harvesting information, chemical application information, weather information and location data.

A defined geographic area refers to one or more of the following: a field location, a sub-field location, geographic coordinates defining the field location, geographic coordinates defining the sub-field location, geographic coordinates defining the boundary of a region associated with a particular crop, and geographic coordinates defining the boundary of a region associated with an adjacent crop.

The location data may be associated with other corresponding production information to provide location data versus planting information, location data versus growing information, location data versus chemical application information, location data versus adjacent field information, location data versus adjacent crop information, and location data versus weather information. The location data and other corresponding production information may be stored in data storage or computer memory in the form of a look-up table, a relational database, or otherwise.

The pre-planting information relates to any of the following: historical planting information, historical growing information, historical harvesting information, and historical chemical application information. Further, the pre-planting information may, but need not, relate to the genetic data on the seeds or plant life. The planting information includes information such as the seed variety, the seed source, the location where the seed is planted, the date planted, soil condition, soil factor values, settings of the planting machinery and any chemicals applied at the time of planting, and other agronomic factors. The seed variety information can be obtained from the seed supplier, supplier invoice, receipt, documentation, seed contract, the seed bag or another container in which the seed is delivered.

The growing information on growing of the crop may be collected during the growing of the crop. The growing information may include one or more of the following: chemical data, fertilizer data, nutrient data, pesticide data, herbicide data, fungicide data, irrigation data, water data, temperature data, sunlight data, growing degree day data; rate of application of at least one of a chemical, fertilizer, nutrient, pesticide, herbicide, fungicide, water, or another crop input; and rate of application versus location of application of a least one of a chemical, fertilizer, nutrient, pesticide, herbicide, fungicide, water, or another crop input. The weather information may include daily temperature, daily precipitation, weekly temperature, weekly precipitation, or temperature or precipitation for other time periods, for example.

Harvesting information includes information such as the harvesting date, the harvesting location, yield of the harvested particular crop, moisture content of the harvested particular crop, the physical condition of the harvested particular crop, various settings of the harvesting machinery or machine, a measure of a particular trait or characteristic of the crop, and an storage identifier of one or more storage volumes into which the harvested particular crop is or was loaded. If a data profile contains different classifications (e.g., planting information, growing information, and harvesting information, chemical application information, and weather information) of crop data or a combination of production information, processing information, and manufacturing information, the data profile may be referred to as a collective data profile or a data profile.

Chemical information may include an identity of a chemical, identity of a compound, identity of a formulation or treatment, fertilizer data, insecticide data, herbicide data, a rate of application of the chemical, a concentration of the chemical, a manufacturer of the chemical, the solubility of the chemical, a measure of acidity or alkalinity of the chemical, or other chemical-related information. One or more chemicals or compounds may be applied before, after or during the planting of a particular crop or a precursor to the particular crop.

A data profile may represent a description or definition of a particular crop, a derivative product derived from the particular crop, or a final product derived from the particular crop. The data profile may have a temporal component (e.g., growing season or time span associated with the particular crop), a geographic component (e.g., a planting location and harvesting location of the particular crop), and a descriptive component (e.g., a characteristic of the particular crop).

The terms "seed" and "seed stock" are to be broadly interpreted herein to include anything set in place to grow a crop. Accordingly, the term "seed" includes seeds, seedlings, transplants, grafts, spores, cane billets, seed potatoes, and other immature plant-life without limitation. In the case of a flat of seedlings, seed and source information may be contained in a barcode or a radio frequency (RF) tag on the flat. For larger transplants, individual plants may have a barcode or an RF tag.

Where the term "field" is used herein, it is to be broadly interpreted to include any area where a crop is produced such as an open field, an orchard, a groove, a forest, a hothouse, an indoor crop production facility, or another suitable crop growing area without limitation. Planting in soil is also not required. The plants or seeds may be grown hydroponically, with or without a medium to provide mechanical support of the plant.

As used herein, a storage volume or segregated storage means may comprise any of the following: a container, an inter-modal freight container, a segregated storage bin, a segregated storage bin of a grain elevator, and any other fixed or mobile container for holding a crop or agricultural product.

In one embodiment, the crop tracing method and system of the present invention traces the crop through the agricultural production process. The production process may include any of the following agricultural activities and associated production information: the planting of the seed, the harvesting of the mature crop, chemical application before or after planting, weather information during the growing season, mechanical soil treatment, and other agronomic inputs. Different production information may be processed (e.g., combined, arranged, and filtered) to provide a data profile for the harvested crop or agricultural product. The data profile is associated with a storage identifier of each storage volume (e.g., container) into which the crop is placed. The data profile and the associated storage identifier (e.g., container identifier) are maintained in a data storage device or in a database. For example, the database can be maintained by a producer at the farm office, by an information service provider, or by both the producer and the information service provider. An information service provider (or holder of data profiles) operates a data service (e.g., a web site) accessible via a communications network (e.g., the Internet) to enable information to be easily transferred to the information service provider and accessed by others (e.g., downstream supply-chain members or consumers). The producer (i.e., grower) can use the data profile to market or sell the crop and can also deliver the data profile to a purchaser of the crop or to a downstream users of the crop so the users can obtain an agricultural product with verification and/or a high degree of confidence that a desired differentiated attribute is present.

FIG. 1 is a block diagram of a system for tracing an agricultural product or crop. The system comprises a grower data processing system (310 or 410) that collects crop data (e.g., a data profile or production information) and facilitates transfer of the crop data to a data management system 350. The data management system 350 supports communications with any of the following: the data storage device 351, a subscriber terminal 352, a processor terminal, a manufacturer terminal, a retailer terminal, and a consumer terminal. The subscriber of the subscriber terminal 352 may include, but is not limited to, a processor, a manufacturer, a retailer, a consumer, and other downstream users of the agricultural product or a derivative thereof. A communications network 348 (e.g., Internet) or another communications link supports communications between the data management system 350 and one or more subscriber terminals 352.

In one embodiment, the grower data processing system (310 or 410) is associated with or mounted on an agricultural machine 311 for planting a crop, harvesting a crop, tending plants or engaging in other agricultural activities. The agricultural machine 311 may comprise a harvester, a tractor, a planter, a planting machine, a harvesting machine, a picker, a mower, a combine, a thresher, or another type of agricultural equipment. The agricultural machine 311 may provide a housing or other mounting provisions for the grower data processing system (310 or 410). The grower data processing system (310 or 410) facilitates collection of crop data during one or more of the following activities: pre-planting, planting, growing, harvesting, and post-harvesting activities. The communications between the grower data processing system (310 or 410) and data management system 350 may take place via wires, cable, optical cable, magnetic storage medium, optical storage medium, wireline, wireless, or another data transfer technique. For example, a grower or another user may store crop or profile data on a storage medium (e.g., optical disk) via the grower data processing system 310; and the user may bring the stored crop data or profile data to the data management system 350 for reading of the storage medium by the data management system 350.

The subscriber terminal 352 may represent a processor terminal, a manufacturer terminal, a retailer terminal or another terminal or computer arranged to generate requests or queries of the data storage device 351. The subscriber terminal 352 may support the display or provision of data from the data management system 350 in reply to a user query. Although the subscriber terminals 352 may not be configured to add or append data to the data profile or the database, in an alternate embodiment, one or more particular subscriber terminals may be authorized to change, add, or append the data profile.

Figure 2:
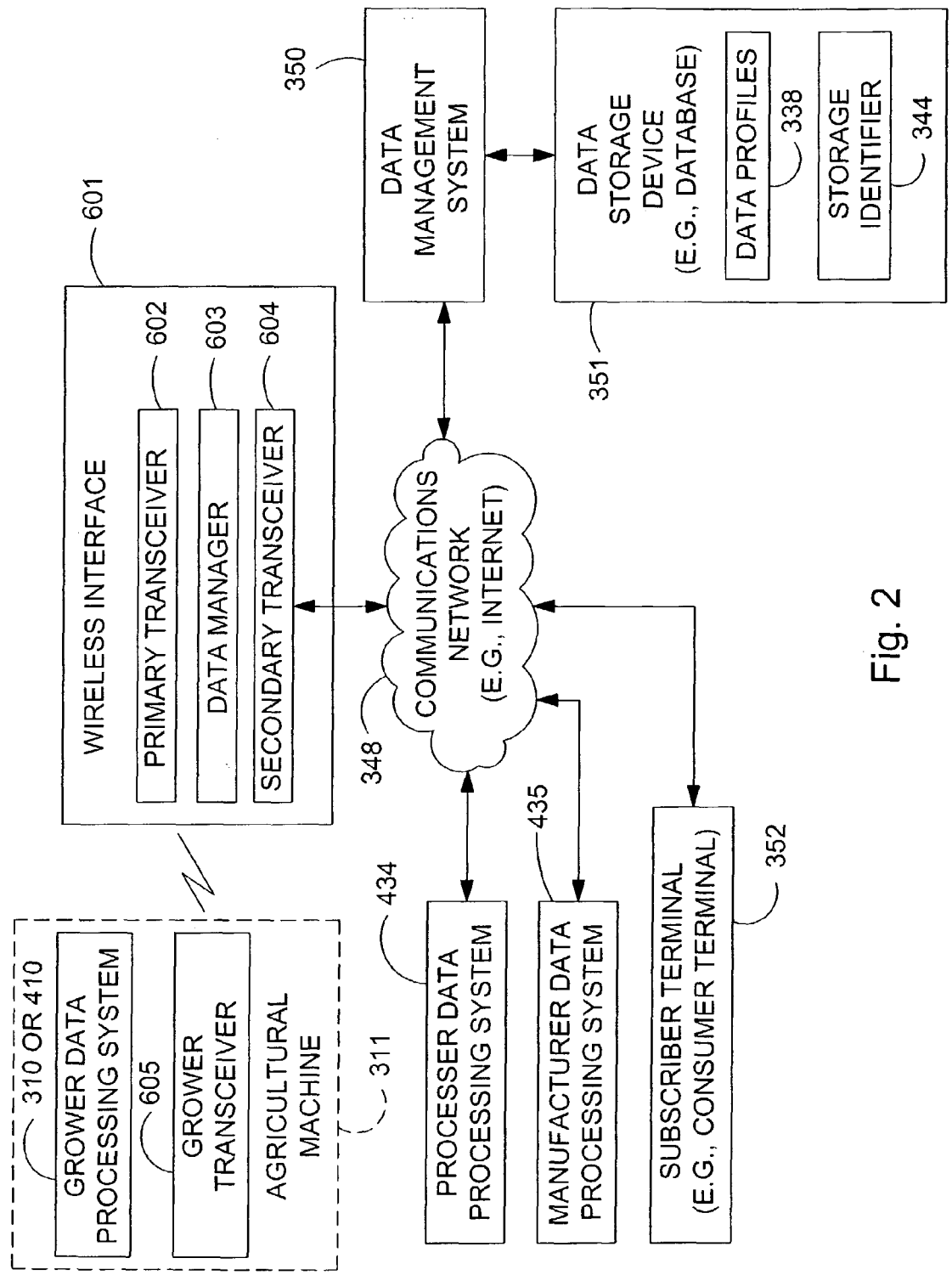
FIG. 2 is a block diagram of another embodiment of a system for tracing an agricultural product.

The system of FIG. 2 is similar to the system of FIG. 1 except the system of FIG. 2 includes a grower transceiver 605, a wireless interface 601, and additional data processing systems (434 and 435). Like reference numbers in FIG. 1 and FIG. 2 indicate like elements.

The grower data processing system 310 provides crop data (e.g., a data profile) to the grower transceiver 605. In turn, the grower transceiver communicates with a transceiver 602 of the wireless interface 601 via an electromagnetic signal (e.g., radio frequency signal). The wireless interface 601 interfaces the grower data processing system (310 or 410) to the communications network 348 to support communications between the grower data processing system (310 or 410) and the data management system 350. One or more additional data processing systems (434 and 435) may communicate with the data management system 350 via the communications network 348. For example, additional data processing systems may include a processor data processing system 434, a manufacturer data processing system 435, or both.

The grower data processing system (310 or 410) supports collection of (e.g., and entry of) crop data (e.g., production data). The grower data processing system may form a data profile from the crop data. The manufacturer data processing system 435 supports collection and entry of manufacturing information. The processor data processing system 434 supports collection and entry of processing information. The grower data processing system (310 or 410), the processor data processing system 434, and the manufacturer data processing system 435 permit a user to enter information to edit, revise, add to, append, or otherwise write to the data profile stored in the data storage device 351 (e.g., database). The data profile describes an agricultural product. In contrast, the subscriber terminal 352 or an associated authentication module 433 (FIG. 4) in the data management system 350 may limit authorization and access to a user or subscriber such that a user may only read the data profile and may not edit, revise, add to, append, or otherwise write to the data profile in the data storage device.

In an alternate embodiment, any of the subscriber terminal 352, the processor data processing system 434, the manufacturer data processing system 435 may be configured with variable degrees of access to information from the data management system 350 via an authentication module 433 (FIG. 4) of the data management system 350, for example. The user may need to enter a password and a log-in identifier, which is evaluated by the authentication module 433, for one or more levels of access to the data profile, or a filtered version of the data profile, a restricted version of the data profile, or an accessible portion of the data profile.

The grower data processing system (310 or 410) includes a transmitter or a transceiver for electromagnetically communicating profile data and storage identifier data to the wireless interface 601. The transmitter or transceiver 605 of the grower data processing system (310 or 410) may transmit the profile data and the storage identifier on a periodic basis or on a batch basis, for example. The grower data processing system (310 or 410) may send repeat transmissions of the data profile data and the storage identifier or a training sequence, if the grower data processing system (310 or 410) does not receive a proper acknowledgment of a successful transmission from the wireless interface 601.

In one embodiment, wireless interface 601 comprises a primary transceiver 602 (e.g., a radio frequency (RF) transceiver), a data manager 603, and a secondary transceiver 604 (e.g., a wireline or an optical transceiver). The primary transceiver 602 receives a transmitted data profile and storage identifier from the grower data processing system (310 or 410) and may send an acknowledgement of receipt back to grower transceiver 605 of the grower data processing system (310 or 410). The primary transceiver 602 sends the received data profile and corresponding storage identifier to the data manager 603. The data manager 603 may store the received data profile and the storage identifier to accumulate a proper payload for transmission to the data management system 350. The data manager 603 may authorize transmission of the received data profile and the corresponding storage identifier for arrival at the data management system 350 for availability to the purchaser, processor, manufacturer or other subscriber prior to or simultaneous with the subscriber's receipt of the crop agricultural product (e.g. crop) or the container carrying the agriculturally product. The electromagnetic communications between the grower data processing system (310 or 410) and the wireless interface 601 may employ unlicensed 2 GHz spread-spectrum modulation, an unlicensed infra-red communications protocol, BlueTooth, analog modulation, digital modulation (e.g., time-division multiple access or code-division multiple access), or any other suitable communications technique.

In one embodiment, the wireless interface 601 supports seamless transfer of profile data and corresponding storage identifier data from the agricultural machine 311 to the data management system 350. The grower data processing system (310 or 410) may be programmed to send a load of data profile and corresponding storage identifier data prior to, simultaneously with, or after shutting-down the agricultural machine 311, whenever any new data profile is created or following the occurrence of a triggering event, such as the planting of a particular crop, the growing treatment of a particular crop, chemical application to a particular crop, and harvesting of a particular crop.

In an alternate embodiment, the wireless interface 601 comprises a primary receiver, a primary transmitter, a data manager 603, a secondary transmitter, and a secondary receiver. The primary receiver and primary transmitter replace the primary transceiver 602; the secondary transmitter and secondary receiver replace the secondary transceiver, 604. Although the primary transmitter and the secondary receiver could be eliminated in the alternate embodiment, upon elimination no feedback or acknowledgement transmission would be received at the grower data processing system (310 or 410).

Figure 3:
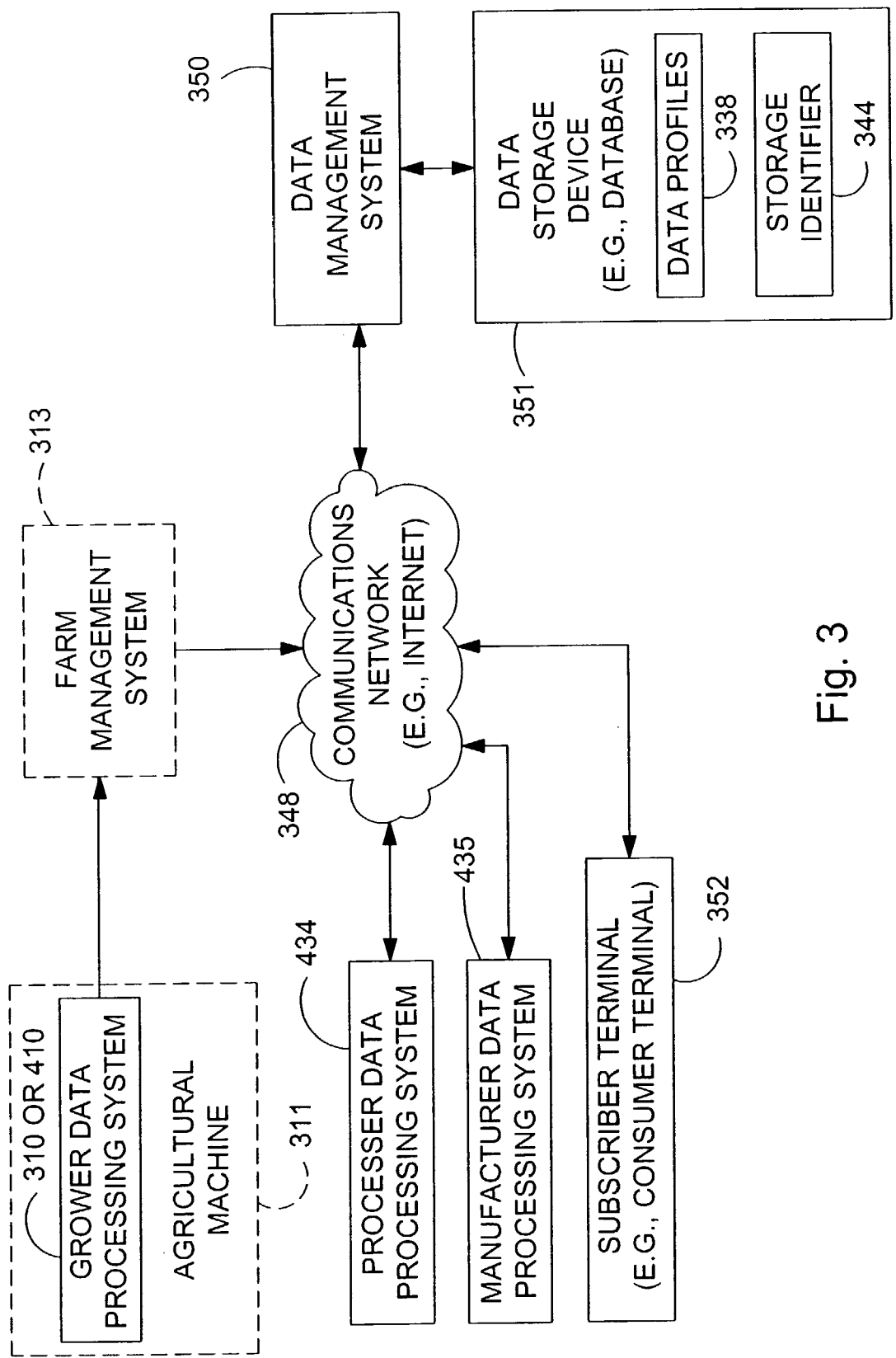
FIG. 3 is a block diagram of yet another embodiment of a system for tracing an agricultural product.

FIG. 3 is a block diagram of a system which is similar to that of FIG. 2 except the system of FIG. 3 deletes the grower transceiver 605, deletes the wireless interface 601 and adds a farm management system 313. Like reference numbers in FIG. 2 and FIG. 3 indicate like elements.

The farm management system 313 may support wireless, wireline, disk transfer, optical medium transfer, magnetic medium transfer or any other method for transferring data from the grower processing system (310 or 410) to the farm management system 313. If the farm management system 313 communicates with the grower data processing system (310 or 410) via a wireless communications link, the grower data processing system (310 or 410) may be coupled to a grower transceiver 605. The farm management system 313 may comprise a legacy or preexisting computer system that has access to a communications network 348 (e.g., access to the Internet via an Internet Service Provider (ISP)). The farm management system 313 may relay, forward, or otherwise send collected information (e.g., a data profile and storage identifier) to the data management system 350 via the communications network 348, postal service, or otherwise. The postal service may be used in remote agricultural areas where Internet access is not readily available or anywhere where Internet access is not desired by the grower.

For example, after completing any pre-planting, planting, growing, harvesting, or shipping activity, a grower or producer could save the profile data and storage identifier to an optical or magnetic storage medium which is compatible with the farm management system 313 or a general purpose computer with communications software (e.g., a web browser). The producer or grower would then log onto a communications interface of the data management system 350, send an Email transmission (e.g., containing a data file) of the profile and storage identifier, or otherwise transfer the profile data and associated storage identifier to the data management system 350 for storage in the data storage device 351 (e.g., a database). Although the data storage device 351 is shown as a centralized data storage device, in an alternate embodiment the data profiles 338 and corresponding storage identifiers 344 may be stored on a distributed basis and accessed by the data management system 351 through the communications network or otherwise.

In an alternate embodiment, the grower data processing system (310 or 410) and the farm management system 313 may communicate with wireless data modems or wireless data transceivers to facilitate seamless communications of the data profile or other crop data from the agricultural machine 311 to the farm management system 313 after the grower performs key tasks with respect to agricultural and agronomic activities.

Figure 4:
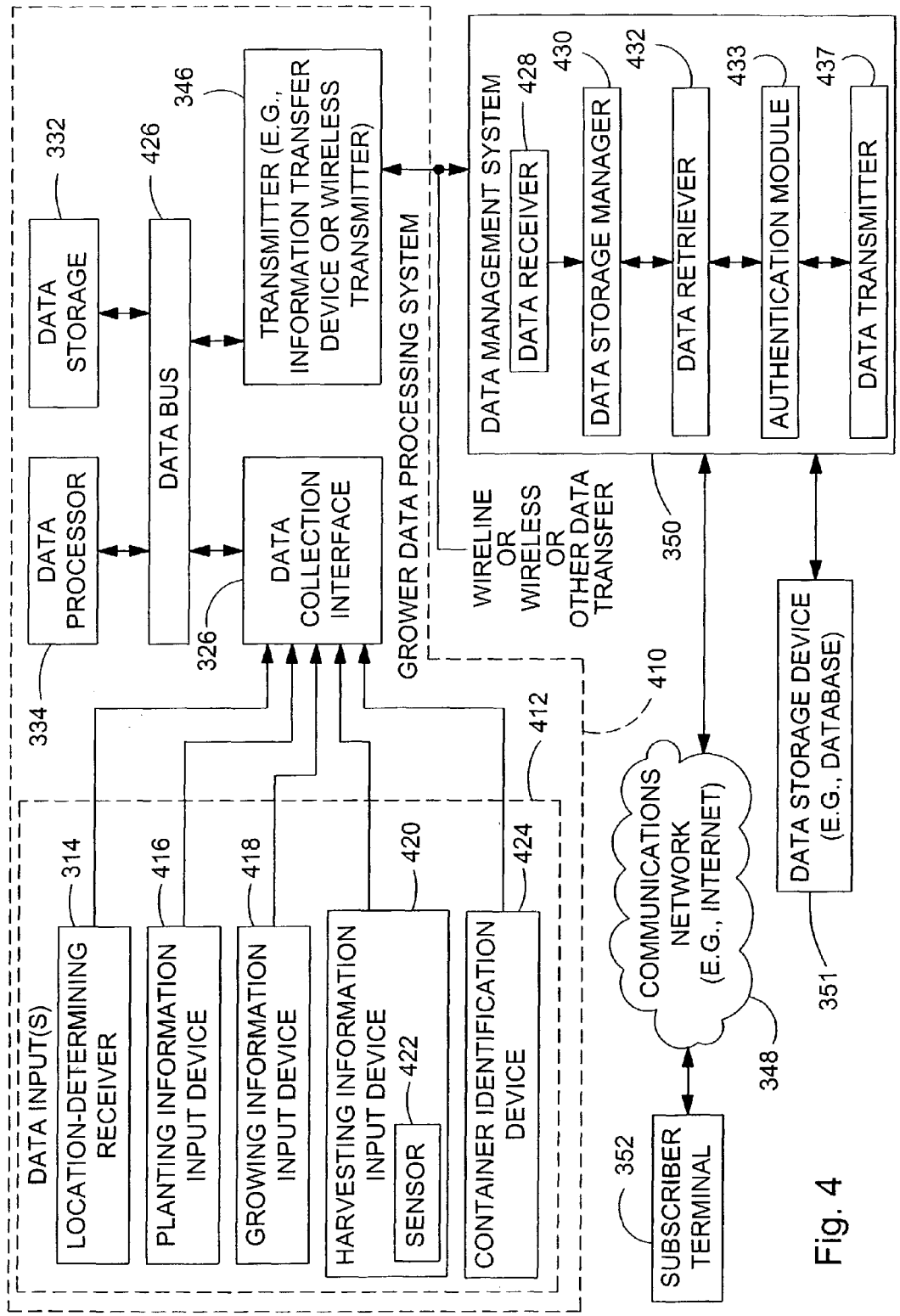
FIG. 4 is a block diagram of a first illustrative example of a grower data processing system associated with a system for tracing an agricultural product.

In FIG. 4, a system for tracing of an agricultural product comprises a grower data processing system 410 that is capable of communicating with a data management system 350 via wireline, wireless, a data network, a communications network, or other transfer technique. In turn, a subscriber terminal 352 communicates with the data management system 350 via a communications network 348. The grower data processing system 410 comprises one or more data inputs 412 coupled to a data collection interface 326. The data collection interface 326, a data storage device 332, a data processor 334, and a transmitter 346 are coupled to a databus 426.

The data management system 350 includes a data receiver 428 for providing received data to a data storage manager 430 or the data storage device 351. In one embodiment, the data receiver 428 receives one or more data profiles from the grower data processing system (310 or 410). The data storage manager 430 may store the received data profiles of particular crops associated with corresponding geographic areas. In another embodiment, the data receiver 428 receives adjacent crop information regarding an adjacent crop in an adjacent location with respect to the particular crop. The data storage manager 430 may combine the adjacent crop information into the data profile for the particular crop.

The data receiver 428 may receive a storage identifier and a request for data profile information related to a particular crop associated with the corresponding identifier. A data retriever 432 accesses the data storage device 351 to retrieve stored data in the data storage device 351 to reply to an authorized request of a subscriber submitted via a subscriber terminal 352. The data retriever 432 may retrieve at least a portion of the requested information or the data authentication module 433 may prohibit or restrict access to the requested information or a portion of the restricted information consistent with a security scheme. The data retriever 432 may use location data associated with the storage identifier to find related planting data and related harvesting data for the particular crop associated with a defined geographic area. The data transmitter 437 of the data management system 350 may transmit or otherwise output at least a portion of the requested information. The request to the data receiver 428 and the corresponding output information from the transmitter 437 may include one or more of the following related to a particular crop, an agricultural product, or a derivative thereof: production information, processing information, manufacturing information, retail information, and packaging information.

In general, data input devices 412 refer to any input device for providing or facilitating the collection of one or more of the following types of input data: geographic information, pre-planting information, planting information, growing information, harvesting information, chemical information, machine electronics information, sensor information, container identifier information, and weather information. The input data may relate to the characteristics of the particular crop associated with a defined geographic area for the same growing season. During planting, growing, or harvesting operations, a location-determining receiver 314 (e.g., a Global Positioning Receiver (GPS) with differential connection or a differential correction receiver) may provide geographic information on the location of an agricultural machine 311 or location data versus time data of the agricultural machine 311, on which the location-determining receiver 314 is mounted. The location-determining receiver 314 is adapted to be used during planting and harvesting operations to receive signals for determining a planting location data and harvesting location data for the particular crop. In one embodiment, the location-determining receiver 314 with differential correction is associated with a guidance system of the agricultural machine 311 for guiding the agricultural machine 311 in a generally linear manner in a series of substantially parallel rows.

During planting operations, the planting information input device 416 may provide planting information or planting information versus location data associated with the planting of a seed or another precursor to an agricultural product or a crop. During growing operations, the growing information input device 418 may provide growing information or growing information versus location data associated with growing and maintenance of an agricultural product or crop. During harvesting operations, the harvesting information input device 420 may provide harvesting information or harvesting information versus location data associated with growing and maintenance of an agricultural product or crop. During or after harvesting operations, a container identification device 424 (e.g., optical, radio frequency, or electromagnetic detector or reader) supports identification of storage volumes (e.g., containers) to distinguish one storage volume (e.g., container) for holding the crop from another storage volume. The storage volume may comprise a container, a segregated storage bin, or any other mobile or stationary container for storing an agricultural product or crop.

The data collection interface 326 receives the input data from one or more of the foregoing data inputs 412. The data processor 334 may arrange or organize the input data prior to storing the input data in the data storage 332 or transferring the input data to another address or device. In one embodiment, the arranged input data may be referred to as a data profile. The data storage device 332 stores or electronically records at least one of crop information, planting information, planting location data, growing information, harvesting information, harvesting location data, processing information chemical application information, and weather information about the characteristics of a particular crop from a defined geographic area.

The transmitter 346 or another information transfer device is capable of transmitting the electronic data profile or a component thereof to the data management system 350, via one of several alternate techniques. The data management system 350 may be remotely situated from the agricultural machine 311 and the transmitter 346 associated therewith. The transmitted component of the data profile may include a planting location, a harvesting location, the planting information (e.g., collected seed information), the harvesting information, the crop information, and the container identifier. Under a first technique, the transmitter 346 represents a transmitter for transmitting data over wires, a cable, optical cable, a microwave link, or another communications line. Under a second technique, the transmitter 346 represents a wireless transmitter for transmitting data to a receiver or transceiver associated with the remote data management system 350. Under a third technique, the transmitter 346 represents a data writing device, a data recording device, a magnetic recording device or an optical recording device for recording or down-loading the data profile on a portable storage medium, such as a magnetic disk, a floppy disk, an optical disk, or a magnetic tape. The user may then physically transport, send or move the portable storage medium to a remote location of the data management system 350. At the data management system 350, the gathered profile data is up-loaded or transmitted to the remote data management system 350 via a magnetic reading device or an optical reading device for reading the storage medium.

The data management system 350 may comprise a database management system for archiving one or more data profiles. In one embodiment, each data profile is associated with a particular crop from a defined geographic area. The data management system 350 makes available at least a portion of the data profile to a user, a subscriber, or recipient of particular crop and a derivative product thereof. A subscriber or user may request data profile or a portion of a data profile on a particular crop or a particular agricultural product by sending an electronic request from a subscriber terminal 352 to the data management system 350 via a communications network 348 (e.g., the Internet). At the data management system 350, a data retriever 432 or request handler may receive the request. The authentication module 433 may authenticate a user identity, a user request or both as a precondition prior to responding to the user or prior to providing data access, or prior to providing data management system resources. The authentication module 433 may compare log-in identifiers and corresponding passwords to an authorized list of authorized log-in identifiers and corresponding passwords. In response to the request, the request handler 432 may obtain, seek, or search for a record associated with a particular data profile in the data storage device 351. In one embodiment, the data retriever 432 includes a search engine for searching the data storage device 351.

In another embodiment, the subscriber terminal 352 comprises a client, whereas the remote data management system 350 comprises a server. Accordingly, commercially available client-server software may be used or modified to share, retrieve, or send profile information from the data storage device 351 of the remote data management system 350 or from another data storage device remotely accessed via the data management system 350.

Figure 5:
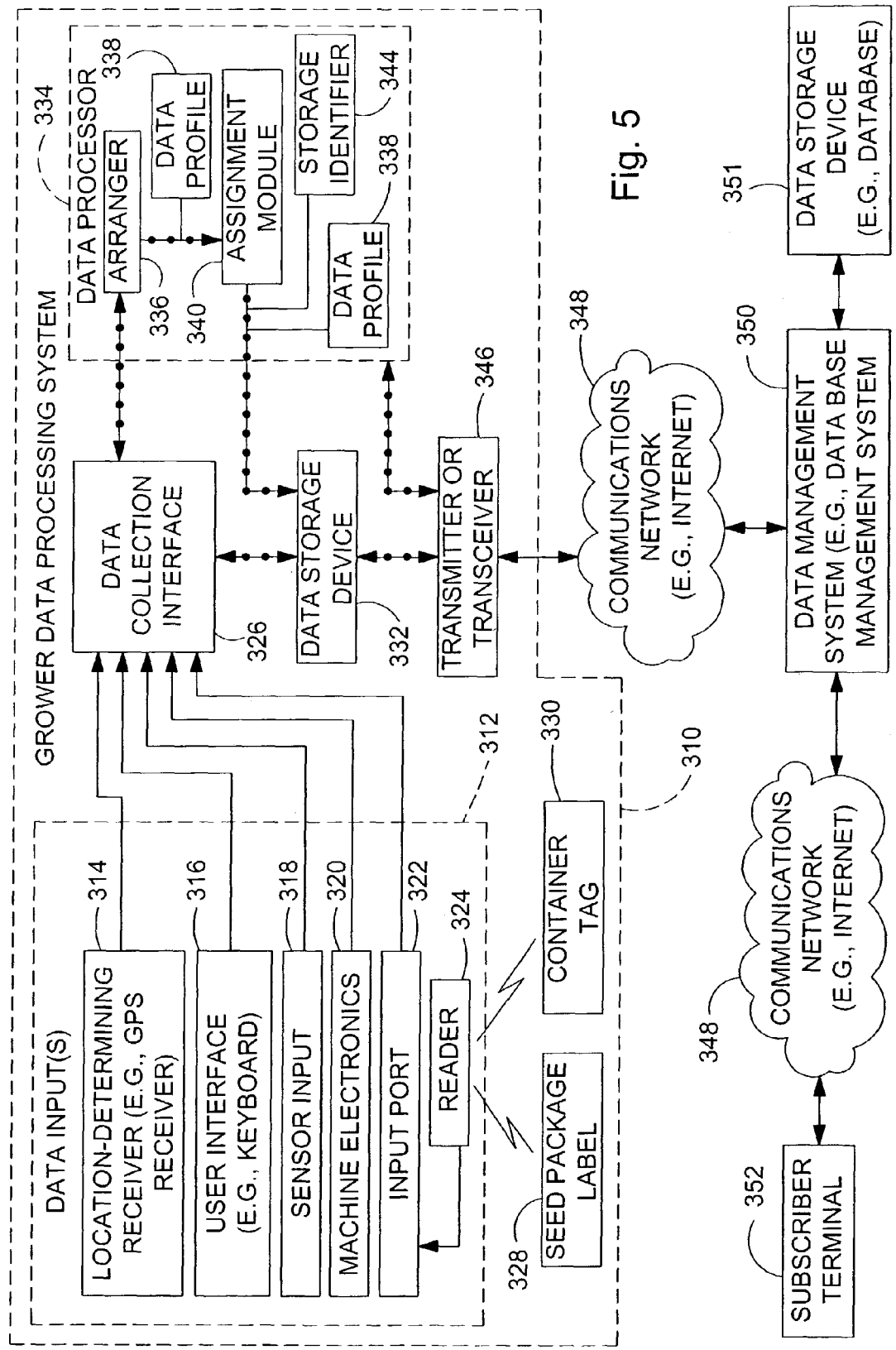
FIG. 5 is a block diagram of a second illustrative example of a grower data processing system associated with a system for tracing an agricultural product.

FIG. 5 shows an alternate embodiment of a system for tracing a crop or agricultural product. The system of FIG. 5 is similar to the system of FIG. 4, except the data inputs 312 are different. Further, in FIG. 5, the processor 334 is shown in greater detail where logical data paths are indicated by lines or arrows with dots. Like elements in FIG. 4 and FIG. 5 are indicated by like reference numbers.

The data input devices 312 comprise data sources. The data input devices 312 include one or more of the following: a location determining receiver 314, a user interface 316, a sensor input 318, machine electronics 320, input port 322, and a reader 324. The user interface 316 may comprise at least one of a keypad, a keyboard, a pointing device (e.g., mouse), a switch, and a display. The user interface 316, the sensor input 318, machine electronics 320, the input port 322, and the reader 324 may be used, individually or collectively, to collect one or more of the following data types: planting information, growing information, harvesting information, weather information, and adjacent crop information. The sensor input 318 may comprise one or more sensors mounted on the agricultural machine 311 (e.g., combine), such as yield sensors, moisture sensors, harvesting information sensors, harvested crop-information sensors, agricultural machine-setting sensors or other detection devices as will be later described in more detail. The sensor input 318 may collect harvesting information and crop information associated with the particular crop during or after harvesting. The input port 322 may interface with a standard or proprietary interface to allow third party devices to interface with the grower data processing system 310. In one embodiment, the input port 322 may represent an standard I/O port configuration (e.g., an RS-232 port configuration), a parallel port configuration, or a serial port configuration.

A reader 324 may be coupled to the input port 322 or otherwise coupled to the grower data processing system (310) to collect data from any of the following items: an optically readable label, a radio frequency tag, an infra-red tag, a tag, a label, a seed package label 328, a document associated with a seed or agronomic input, a storage identifier associated with a storage volume, storage identifier associated with an intermediate vessel, and a container tag 330 associated with a container for holding the harvested crop. For example, the reader 324 may electronically record the storage identifier of one or more storage volumes for holding the particular crop in a segregated manner after harvesting to maintain the integrity and the purity of the particular crop. In one embodiment, the reader 324 electronically reads or collects the storage identifier substantially contemporaneously with filling a respective storage volume with a harvested particular crop. In another embodiment, the reader 324 is adapted to record input data (e.g., transit information) regarding the time and location of the discharging of the crop into an intermediate vessel and removing the crop from the intermediate vessel, prior to storing the crop in a storage volume.

In one embodiment as illustrated in FIG. 5, the data processor 334 comprises an arranger 336 coupled to an assignment module 340. The arranger 336 receives input data from the data collection interface 326 or the data storage device 332. The arranger 336 arranges or organizes the input data or recorded information to form a data profile 338. For example, the arranger 336 may group the input data by location data in the input data, such that planting, growing, and harvesting information for the same geographic area (e.g., same field or subfield unit of area), the same growing season, and the same crop are grouped together. The assignment module 340 accepts the data profile 338 from the arranger 336. The assignment module 340 obtains a storage identifier 344 for assignment to a corresponding data profile 338 for example, the reader 324 may read a storage identifier from a container tag 330 on a storage volume (e.g., container) holding a crop or agricultural product.

The assignment module 340 may assign the storage identifier 344 to the corresponding data profile 338 in accordance with several alternate techniques. Under a first technique, the assignment module 340 may assign a scanned or read storage identifier 344 to a data profile of a particular crop if the reading time and the reading location matches or is sufficiently correlated to a harvesting location and a harvesting time. The data profile may include particular location data for a harvesting site of a particular crop. Accordingly, the storage identifier may be used to identify or cross-reference the harvesting site or location data for a particular crop. Under a second technique, the assignment module 340 may assign a scanned or read storage identifier 344 to a data profile 338 based on a manual entry or manual assignment made before, during, or after harvesting. Under a third technique, the assignment module 340 may assign a scanned or read storage identifier 344 to the data profile 338 based on a location data versus time data of the container having a storage identifier 344 matching the location data versus time data of an agricultural machine or a harvesting machine for harvesting a particular crop. Under a fourth technique, the data profile and the corresponding storage identifier may be pre-assigned, dedicated, or assigned to a particular crop, for a particular field, or a particular grower for a defined time period. For example, the assignment module may access a look-up table that contains pre-assigned pairings of profile data and storage identifiers.

Figure 6:
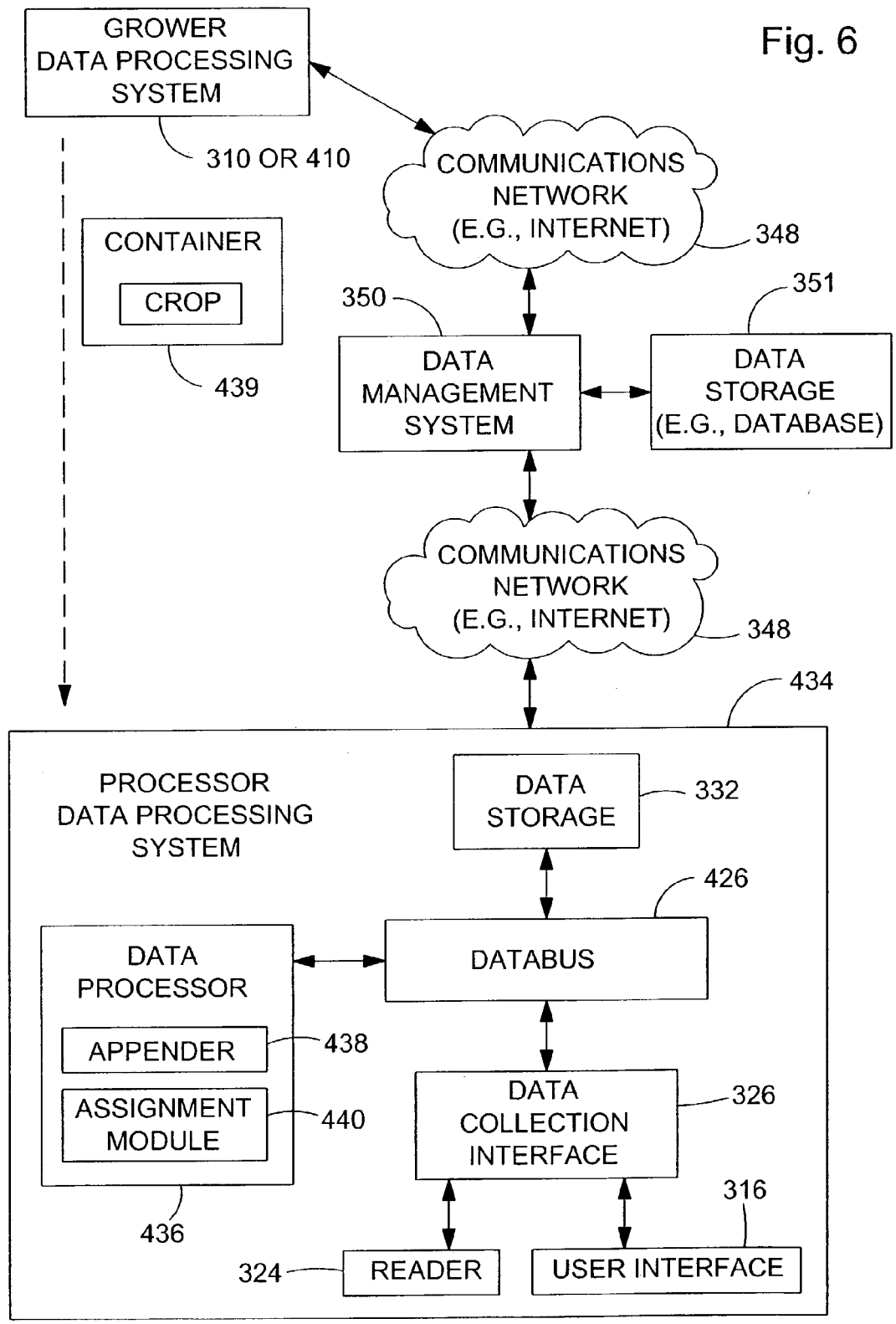
FIG. 6 is a block diagram of an illustrative example of a processor data processing system associated with a system for tracing an agricultural product.

FIG. 6 is a block diagram of a system for tracking a crop or an agricultural product. The system of FIG. 6 is similar to the systems of FIG. 4 and FIG. 5, except that system of FIG. 6 includes a processor data processing system 434 coupled to the data management system 350 via a communications network 348 (e.g., the Internet). Like elements in FIGS. 4, 5 and 6 are indicated by like reference numbers.

The processor data processing system 434 may comprise a data processor 436, a data storage device 332, and a data collection interface 326 coupled to a databus 426 to facilitate the communication and interchange of data. The data processor 436 comprises an appender 438 and an assignment module 440. The appender 438 appends additional crop information to a corresponding data profile or an inchoate data profile. The assignment module 440 assigns a read or assimilated storage identifier to corresponding data profile, corresponding additional crop information, or both. The user interface 316 supports a user's manual entry of data (e.g., crop data or processing information) into a keyboard, a keypad, a graphical user interface, a command line interface, a magnetic disk drive, an optical disk drive, a magnetic storage device, or the like. The grower may transport or authorize transportation of the crop or agricultural product from the grower to a processor in a container 439, as indicated by the dashed line of FIG. 6.

Figure 7:
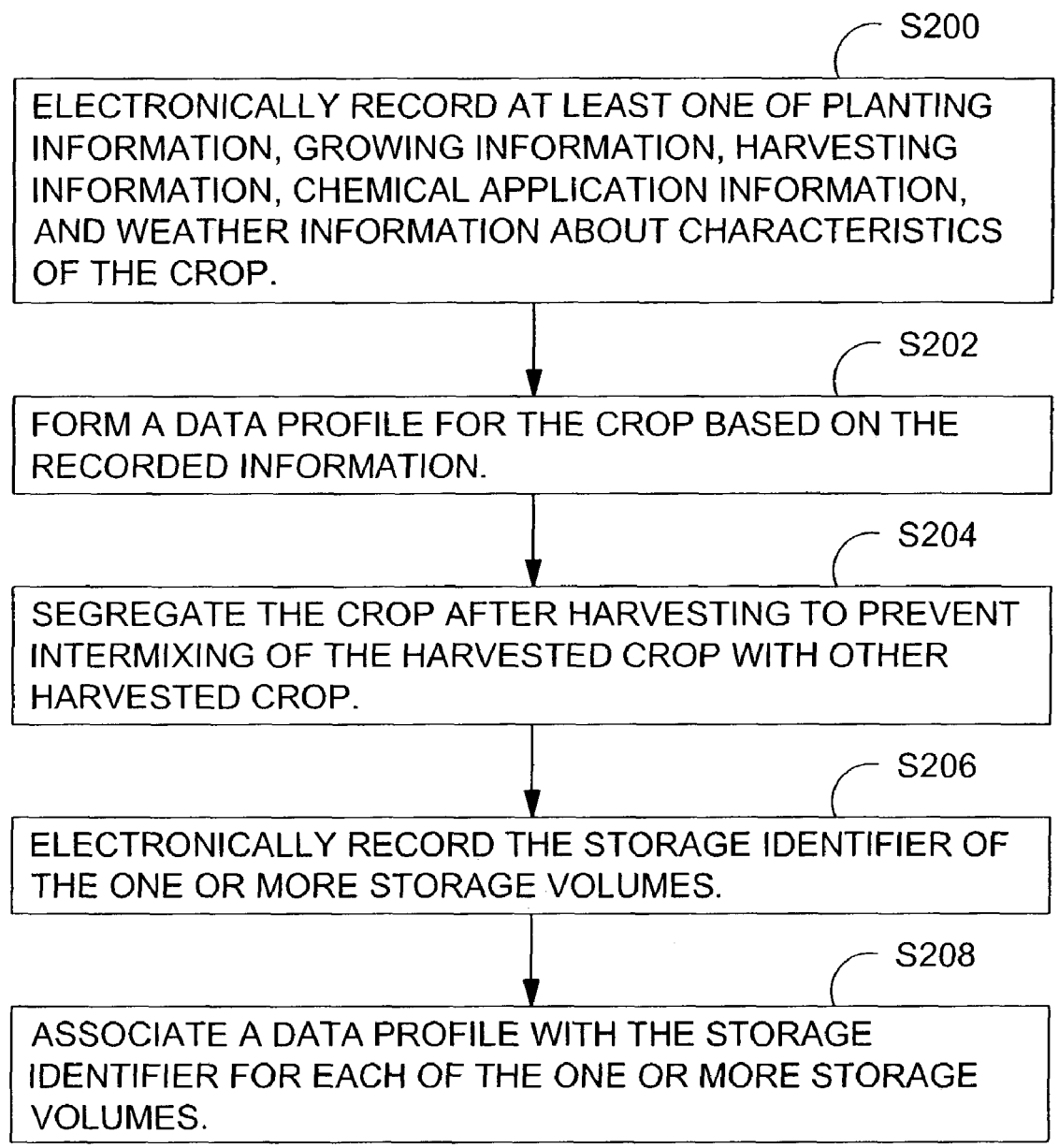
FIG. 7 is a flow chart of a method for automated tracing of an agricultural product.

FIG. 7 is a flow chart of a method of tracing a crop in accordance with one embodiment of the invention. The method of FIG. 7 begins in step S200.

In step S200, a recorder or a data collection interface 326 electronically records at least one of pre-planting information, planting information, crop information, growing information, harvesting information, chemical application information, and weather information about the characteristics of the crop. For example, the collected information is recorded or stored in a data storage device 332 incidental to conducting an agricultural activity, such as pre-planting, planting, growing, chemical application, and harvesting.

The planting information may be collected by a grower data processing system 310, associated with an agricultural machine 311, during or after the planting of a seed, a precursor to a particular crop, or a particular crop. For example, seed or seed stock planting information may be recorded contemporaneously with planting of the seed or stock. The growing information may be collected by a grower data processing system during growing of the crop. Prior to, contemporaneously with, or after the harvesting time when the crop is harvested, harvesting information may be recorded (e.g., electronically recorded) regarding further characteristics of the crop including one or more of the following: the date harvested, the location where harvested, the yield of the harvested crop, the moisture content of the harvested crop, the physical condition of the harvested crop and settings of a harvesting machine used to harvest the crop.

In step S202, a data processor 334 may form or store a data profile for the corresponding crop based on the recorded information. The formed data profile may contain at least one of the of recorded pre-planting information, recorded planting information, recorded growing information, recorded crop information, recorded harvesting information, recorded chemical application information, and recorded weather information collected in step S200 on the particular crop. For example, the data processor 334 may form a crop profile from the combination of recorded planting information and recorded harvesting information from step S200 for a particular crop associated with a defined geographic area and the same time span (e.g., same growing season). The data profile may cover a particular crop from a defined geographic area in which the planting location matches the harvesting location. In other words, each data profile may represent a description of a particular crop for a specific growing season where the planting location and the harvesting location is the same or a common location.

Even after the data profile is formed in step S202, chemical application information, weather information, analyzed crop characteristic information, or other crop information may be appended to the data profile. The analyzed crop characteristic information may be obtained by conducting an analysis (e.g., a genetic test or protein profile) of the particular crop to identify or verify one or more characteristics of the particular crop.

The formed data profile may be handled according to various alternate procedures. Under a first procedure, the data profile of the harvested particular crop is transmitted to a holder of the data profile or the data management system 350. Under a second procedure, the data profile of the harvested particular crop is stored on or in one or more containers. For example, the data profile may be contained in a barcode, an optically readable tag, a radio-frequency tag, an infra-red tag, an electronic tag, or in an electronic data memory device carried in or on each of the one or more containers. Under a third procedure, at least a portion of the data profile of the harvested particular crop is transmitted electronically to one or more potential recipients (e.g., users) of the harvested particular crop, a segregated particular agricultural product, or a derivative thereof. The transmission or delivery of the data profile may facilitate sales to, acquisition by, deliveries to, or process control of the harvested particular crop, segregated particular crop, or a derivative thereof by one or more potential recipients. Under a fourth procedure, the data profile or an inchoate data profile may be formed of a load of profile data gathered during operation of the agricultural machine 311 in response to a triggering event. A storage identifier may be associated with the data profile, where available. A triggering event may represent an operator request or act associated with shutting down or turning of the agricultural machine 311, a data processor 334, or a grower data processing system associated therewith.

In step S204, the particular crop or agricultural product is segregated during and after harvesting from intermixing with other harvested crop. The agricultural machine 311 (e.g., harvesting machine) may be dedicated to harvesting the particular crop with particular crop attributes (e.g., non-GMO corn) or cleaned adequately to remove vegetative matter and significant traces of any previously harvested crop that is distinct from the particular crop. After harvesting, the particular crop may be segregated according to various techniques which may be cumulatively or alternately applied. Under a first technique, the harvested particular crop is segregated by placing the crop in one or more storage volumes (e.g., containers or segregated storage bins) each having a storage identifier. Under a second technique, the harvested particular crop (e.g., particular grain) is placed in one or more containers without first accumulating the crop in a bulk unit larger than the capacity of the container or containers into which the harvested crop is placed. Under a third technique, the particular crop is placed in one or more containers as the particular crop is discharged from a harvesting machine. Under a fourth technique, the harvested particular crop is discharged from a harvesting machine into an intermediate vessel; subsequently the particular crop is removed from the intermediate vessel into one or more storage volumes (e.g., containers); and transit information is recorded regarding time and location of discharging of the particular crop into (e.g., filling) the intermediate vessel and the removing the particular crop from (e.g., emptying) the intermediate vessel of the intermediate vessel to enable association of the data profile with the storage identifier of one or more storage volumes receiving the harvested crop. Under a fifth technique, the particular crop or agricultural product is placed or stored in a segregated bin of a grain elevator that is dedicated to a particular crop (e.g., a particular GMO strain) or cleaned adequately after containing another distinct crop to avoid cross-contamination of the particular crop that later occupies the segregated bin.

In step S206, a reader 324 or container identification device 424 electronically records the storage identifier (e.g., container identifier) of the one or more storage volumes (e.g., containers). The storage identifier may comprise a tag, a radio frequency tag, an infrared tag, a document, a label, a barcode, a document, a universal product code (UPC), one or more alphanumeric characters, or one or more symbols associated with (e.g., affixed to) a corresponding container. The reader 324 may use an optical detector, a radio frequency receiver, or an infra-red receiver to read the tag, for example.

In step S208, a data profile for a particular segregated crop is associated with the storage identifier (e.g., container identifier) of one or more storage volumes (e.g., containers) for the particular segregated crop. For example, the assignment module 340 assigns a storage identifier to a corresponding data profile that pertains to the particular segregated crop that the storage volume affiliated with the assigned storage identifier holds. For example, an information service provider provides the recipient with access to data profiles for crops via a communications link or a communications network (e.g., the Internet) via a subscriber terminal or otherwise.

Following the method of FIG. 7, one or more containers that contain the harvested crop are delivered to at least a potential recipient (e.g., a purchaser, processor, consumer, manufacturer or a user) and at least a portion of the data profile is made available to the crop recipient of the crop or agricultural product.

In one alternate embodiment, the method of FIG. 7 may be modified to track adjacent crop information (e.g., a genetic make-up or profile of the adjacent crop) associated with an adjacent location with respect to the particular crop. The adjacent crop information is combined with the data profile formed in step S202 or as part of the data profile formation in step S202. After step S208, the adjacent crop information may be made available to potential recipient (e.g., a potential purchaser) as a portion of the data profile so that the potential purchaser can conduct genetic tests or other investigation tailored to the possible contamination introduced by the adjacent crop to the particular crop or derivative product thereof. For example, contaminated crops may contain unwanted precursors to medical or pharmaceutical products that would cause the potential purchaser not to purchase the contaminated crops for human consumption or to process the crops to remove such contamination to make the contaminated crops suitable for human consumption. The target unwanted precursors for contamination tests are associated with the corresponding genetic make-up or profile of the adjacent crops and may be stored in a reference look-up table, a database, or an inverted data file.

Figure 8:
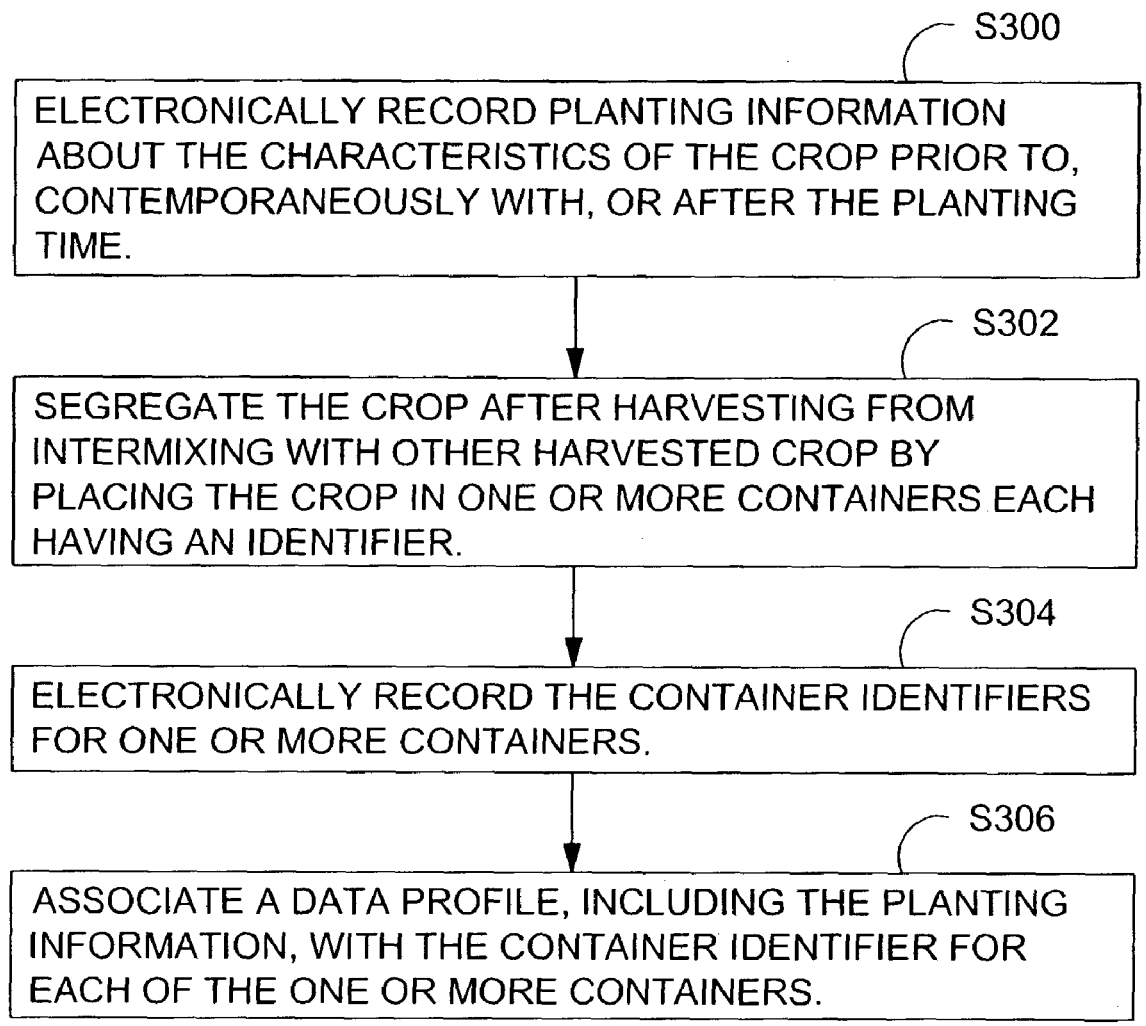
FIG. 8 is a flow chart of an alternate method for tracing of an agricultural product.

FIG. 8 is a block diagram of a method for tracing a crop. The method of FIG. 8 begins in step S300.

In step S300, planting information is electronically recorded about the characteristics of the crop prior to, contemporaneously with, or after the planting time. For example, the planting information input device 416 collects planting information and the data collection interface 326 records it in data storage 332. The planting information may include one or more of the following: the genetic makeup of the seed or plant life, the source or geographic origin of the seed or plant life, the date planted, the identity of the seed or stock, the seed or stocksource, the location where planted, the soil conditions where planted, and any chemical application. Seed or a plant for a crop is planted at a planting time.

In an alternate embodiment, a grower data processing system (310 or 410) supports collecting of production data or addition crop data incidental to the performance of various agricultural tasks and activities associated with the particular crop. For example, harvesting information is collected during the harvesting of the particular crop, along with the harvesting location.

In step S302, the crop is segregated during and after harvesting from intermixing with other harvested crop by placing the crop in one or more containers each having a container identifier. The segregation of the particular crop from other crops facilitates maintenance of the purity and integrity of the particular crop. For example, the harvesting machine may cooperate with a container or other agricultural machinery to fill one or more containers (e.g., intermodal freight containers) at a site where the crop is grown and harvested. The harvesting machine or another agricultural machine may fill the containers with corresponding storage identifiers substantially contemporaneously with harvesting of the crop or at another time. The harvesting machine may be dedicated to a particular crop with corresponding crop attributes to avoid cross-contamination with other harvested crops with different crop attributes. Alternately, if the harvesting machine is used to harvest crops with different crop attributes or incompatible crop attributes, the harvesting machine is cleaned, washed, or sanitized in a sufficient manner to avoid cross-contamination and a desired level of purity in the particular crop. The desired level of purity (e.g., less than 3% contamination by volume) may comply with one or more of the following: government or regulatory standards, certification standards of organic growers, buyer standards of a buyer of the crop, processor standards, manufacturer standards, and grower standards of a grower of the crop.

In step S304, the container identifier is electronically recorded for one or more containers. For example, the reader 324 (FIG. 5) or the container identification device 424 (FIG. 4) reads the storage identifier (e.g., container identifier) and the data collection interface 326 facilitates storage of the read storage identifier (e.g., container identifier) in the data storage device 322.

In step S306, a data profile, including the recorded planting information of step S300, is associated with the storage identifier (e.g., container identifier) for each of the one or more containers. For example, the data processor 334 (FIG. 4) or the assignment module 340 (FIG. 5) may assign a container identifier to a corresponding data profile of a particular crop assigned to the container. The recorded planting information or data profile is associated with the container profile for later referencing of the data profile or the recorded planting information. In one embodiment, the data profile comprises the recorded planting information. In another embodiment, the data profile comprises the recorded planting information and corresponding location data for the field in which the particular crop was planted.

Following step S306, step S300, or both, the data profile may supplemented with additional information from one or more of the following: a grower, an auditor of a grower, a processor (e.g., via a processor data processing system 434), a manufacturer (e.g., via a manufacturer data processing system 435) or another downstream user of the crop, a derivative of the particular crop, or a final product based on the particular crop. The additional information may comprise one or more of the following: production information, processing information, auditing information, manufacturing information, and a packaging identifier. The production information comprises one or more of the following: crop information, the recorded planting information, growing information, harvesting information, weather information, and chemical information. The processing information may relate to one or more processing steps performed by a crop processor or another recipient. The packaging identifier is associated with a package of the particular crop, a derivative product thereof, or a final product thereof.

Figure 9:
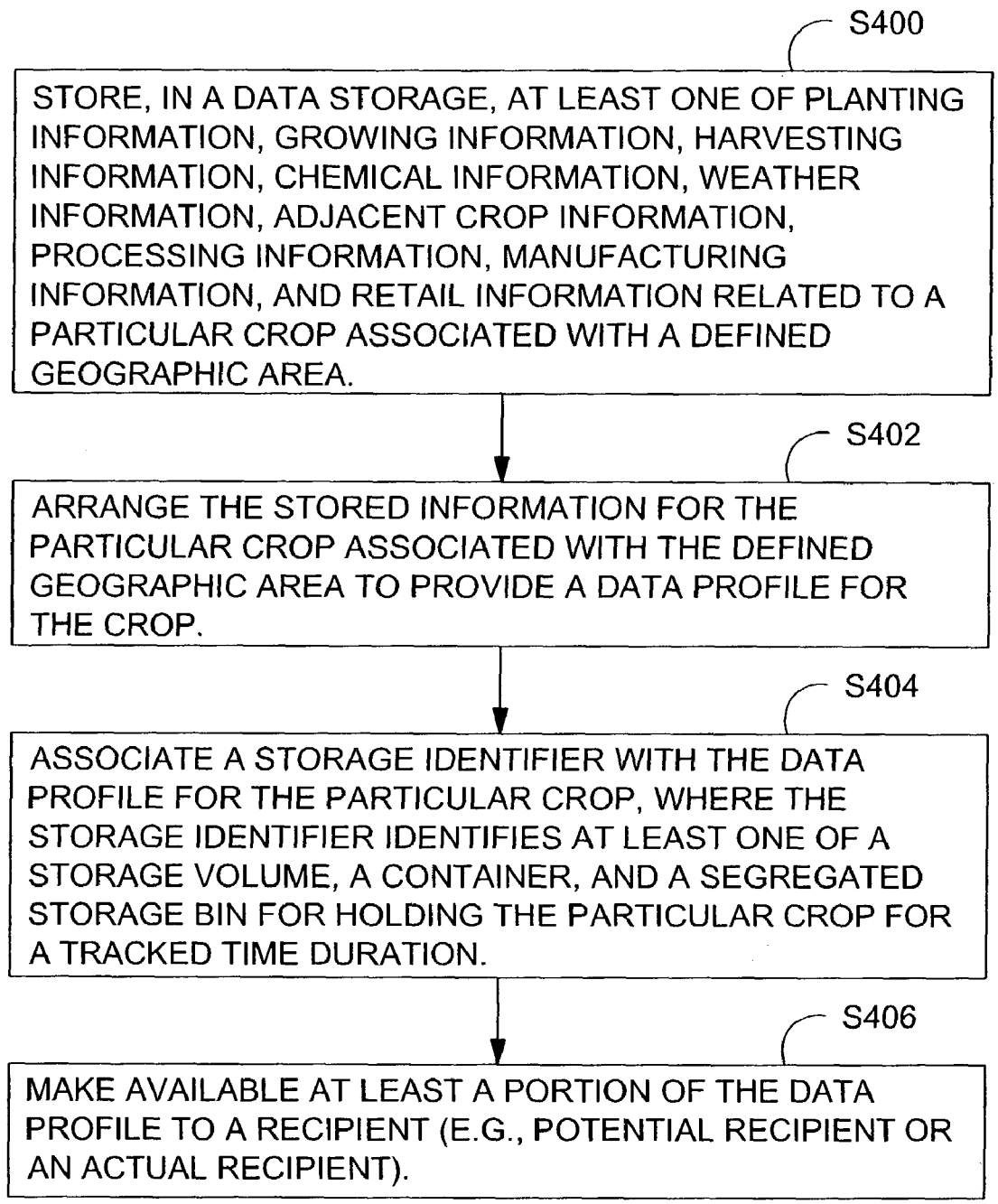
FIG. 9 is a flow chart of another method for tracing an agricultural product.

FIG. 9 is a flow chart of a method for tracing of a crop or an agricultural product. The method of FIG. 9 starts in step S400.

In step S400, a data collection interface 326 of a data processing system (e.g., a grower data processing system (310 or 410) or a processor data processing system 434) stores, in data storage 332, at least one of pre-planting information, planting information, growing information, harvesting information, chemical information, weather information, adjacent crop information, production information, processing information, manufacturing information, and retail information related to a particular crop associated with a defined geographic area. Location information is recorded electronically during at least one of the planting, growing, and harvesting operations.

The planting information comprises one or more of an identity of the seed, a seed or stock source, a seed or stock parentage, a crop maturity date, a date planted, a location where planted, soil conditions when planted, fertilizer, insecticide, herbicide, and any other chemical application. The planting location where planted is electronically recorded or stored during or after the planting. The planting information is collected or stored prior to, during, substantially contemporaneously with, or after planting.

The growing information may include at least one of chemical data, fertilizer data nutrient data, pesticide data, herbicide data, fungicide data, irrigation data, water data, temperature data, sunlight data; and rate of application of at least one of a chemical, fertilizer, nutrient, pesticide, herbicide, fungicide, water, or another crop input; and rate of application versus location of application of at least one of a chemical, fertilizer, nutrient, pesticide, herbicide, fungicide, water, or another crop input.

The harvesting information about further characteristics of the crop may include at least one of the date harvested, the harvesting location, the yield of the harvested crop, the moisture content of the harvested crop, the physical condition of the harvested crop, and settings of a harvesting machine used to harvest the crop. The harvesting location where harvested is electronically recorded or stored during, substantially contemporaneously with or after the harvesting. The harvesting information is collected or stored prior to, during, substantially contemporaneously with, or after harvesting.

The stored weather information is associated with the defined geographic area (e.g., region or micro-climate) where the particular crop is grown.

Chemical information is collected regarding the fertilizer, insecticide, herbicide or other chemical applied before or after planting the crop and adding the chemical information to the data profile. Weather conditions are recorded at the location of the crop or the defined geographic area associated with growing the crop. The weather information may be added or appended to the data profile after initial formation of the data profile.

Adjacent crop information may be recorded or tracked regarding crop in an adjacent location (e.g., an adjacent field) to a primary location (e.g., a primary field) of a particular crop including one or more of the following: a genetic profile of an adjacent crop or a precursor thereto, a genetic make-up of an adjacent crop or precursor thereto, identity of the seed or stock, the seed or stock source, the seed or stock parentage, the crop maturity, the date planted, the location where planted, the soil conditions when planted, and any chemical application for the adjacent crop and combining the adjacent crop information into the collective data profile. The adjacent crop information may be used to determine whether sufficient spatial isolation exists between neighboring growing areas (e.g., between a primary field and an adjacent field) to prevent or reduce cross-pollination or cross-contamination of neighboring crops. Cross-contamination of genetically modified crops with conventional crops or other genetically modified crops may produce crops or agricultural products with impure, unintended, or unwanted genetic characteristics.

Production information refers to agricultural inputs associated with the planting, growing, and/or harvesting of a particular crop. The processing information, manufacturing information and retail information may relate to the particular crop, a particular agricultural product, a derivative product derived from the particular crop, or a final product derived from the particular crop. Processing information relates to the processing of a harvested particular crop by a crop processor, a subsequent processor, or both. Processing information may concern one or more processing steps for performance by a crop processor as a crop recipient. Manufacturing information relates to making of a derivative product or a final product from the processed or harvested particular crop. Retail information relates to information for a consumer, a retail purchaser, or a retail wholesaler for a particular crop, a processed particular crop, a derivative of a particular crop, or a final product based on the particular crop, for example. The retail information may comply with labeling regulations, standards, and laws.

In step S402, a data processor 334 or an arranger 336 arranges the stored information for a particular crop associated with the defined geographic area to provide a data profile 338 or collective data profile for the crop. The data profile for a crop may include a crop identifier, a characteristic of a particular crop, information collected by a grower data processing system (310 or 410), or other information. In one embodiment, the arranger 336 combines the stored planting and harvesting information for a defined geographic area associated with the particular crop or agricultural product to provide a data profile 338 or collective data profile. In another embodiment, the arranger 336 combines the planting information and harvesting information to provide the data profile 338 based on sufficient correlation or matching of recorded planting location information and recorded harvesting location information during a same growing season to identify the particular crop from the defined geographic area. Planting information and harvesting information is combined into a data profile for the particular crop if the data arranger 336 determines matching or sufficient correlation is present.

In general, the data arranger 336 or processor may form the data profile by arranging collected data from two or more of the following data classifications: collected planting information, collected growing information, collected chemical application information, and collected weather information. For example, the arranger 336 assembles or extracts data from two or more of the foregoing data classifications by same or similar location data associated with the collected data from the different data classifications. The data processor 334 or the arranger 336 may organize or combine the collected planting information and the collected harvesting information to form the data profile based on collected planting location information and collected harvesting location information for the crops, such that the planting information is correlated to respective harvesting information for a geographic location or geographic area in which in the crop is grown. The data arranger may filter the data profile based on the desired information or requisite information to reduce data storage requirements and to make retrieval information more efficient.

In preparation for step S404, the reader 324 reads a storage identifier (e.g., a container identifier) for storing a data profile in the data storage device 332, the data storage device 351, or both. The storage identifier may represent a container identifier and is associated with one or more containers into which the particular crop is placed during or after harvesting.

In step S404, an assignment module 340 associates the storage identifier 344 with the respective data profile 338 for the particular crop. The storage identifier 344 identifies at least one of a storage volume, a container, and a segregated storage bin for holding the particular crop for an assigned time duration or for some other tracked time duration. After the storage identifier is associated with the corresponding data profile for the particular crop or derivative thereof; then the storage identifier may be stored in the data storage along with the data profile or merged into the data profile.

In step S406, the data management system 350 makes available at least a portion of the data profile (e.g., data profile 338) to a recipient, an actual recipient, or a potential recipient of the particular crop. For example, the grower data processing system 310 transmits the data profile 338 of the particular crop to the data management system 350 to make the data profile 338 available for distribution to potential recipients, actual recipients, subscribers (e.g., via subscriber terminals 352) or other users of the data management system 350.

In accordance with one example of step S406, the data management system 350 provides the data profile 338 to a subscriber, potential recipient, actual recipient, recipient, or user (e.g., a consumer via a subscriber terminal 352) that seeks to identify a characteristic of the particular crop, a derivative product of the particular crop, or a final product based on the particular crop. The data management system 350 may transmit the data profile related to the particular crop to one or more potential users, potential recipients, or actual recipients of the particular crop, a derivative of the particular crop, or a final product derived from the particular crop.

A characteristic of a particular crop is based on the genetic make-up of the particular crop, the growing environment for a particular crop, or both. The characteristic may comprise at least one of the following: organically grown, genetically modified, non-genetically modified, altered protein content, altered oil content, altered enzyme content, size, weight, appearance, sugar content, perishability, storability, and preservability. From the subscriber terminal 352, a subscriber (e.g., a processor or purchaser) may evaluate the profile of a particular crop to facilitate a purchase of, sales to, acquisition by, deliveries to, or process control of the particular crop by one or more of the users.

The potential recipient (e.g., a crop processor) might receive the particular crop, whereas the actual recipient receives the particular crop or a storage volume holding the particular crop. A potential recipient may represent a potential purchaser, potential consumer, a potential user of a particular crop, a derivative product derived from the particular crop, or a final product derived from the particular crop. The potential recipient may review crop profile for different crops to obtain crops with desired characteristics. Once the potential recipient places an order, accepts an order, or purchases a crop, the potential recipient is transformed into an actual recipient, barring any unsuccessful delivery of the particular crop.

The data management system 350 may store adjacent crop information regarding crop in an adjacent location to the particular crop. The adjacent crop information may come from data profiles transmitted from adjacent growers to the data management system 350 via the communications network 348, for example. The subscriber terminal 352 may retrieve or access the adjacent crop information to allow a subscriber to estimate, determine, or evaluate the probability or likelihood of cross-crop pollination, cross-crop contamination, or failure to properly express desired crop attributes. The adjacent crop information may include one or more of the following: the identity of the seed or stock, the seed or stock source, the seed or stock parentage, the crop maturity, the date planted, the location where planted, the soil conditions when planted, and any chemical application for the adjacent crop and combining the adjacent crop information into the collective data profile (e.g., data profile 338). Additional production information may be garnered from genetic testing of the particular crop or derivative product based on a genetic profile of the adjacent crop.

After step S406, the recipient of the particular crop or a derivative thereof may append other information to the data profile. The recipient pay append one or more of the following to the data profile: production information, adjacent crop information, processing information, manufacturing information, and retail information. For example, the recipient may append the data profile with processing information regarding one or more subsequent processing steps preformed by a subsequent crop processor.

Further, after step S406, the recipient of the particular crop may make available at least a portion of the data profile to a subsequent recipient (e.g., a subsequent crop processor or downstream recipient) that receives the particular crop or a derivative product thereof after the recipient (e.g., the crop processor) receives the particular crop.

Figure 10:
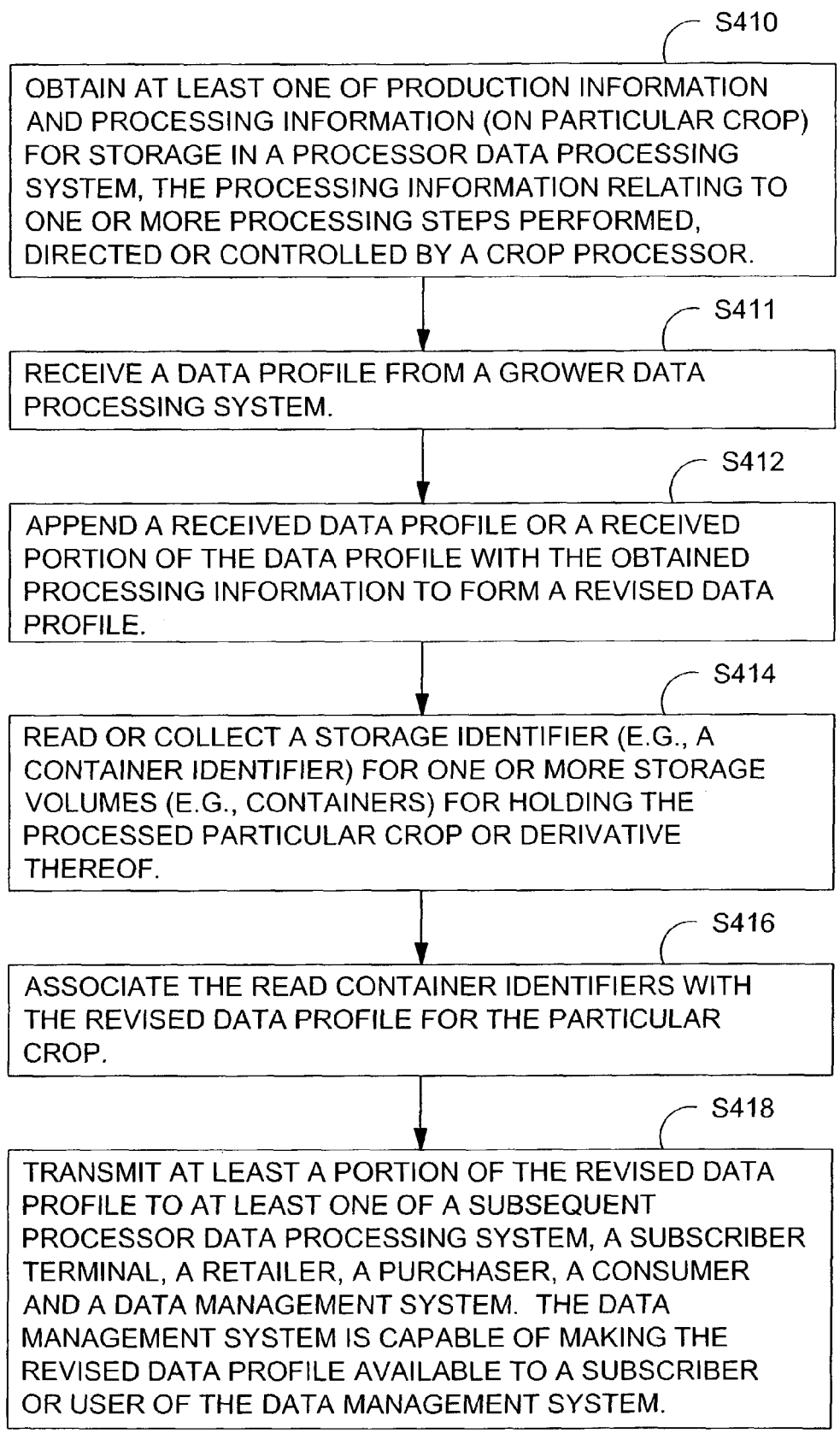
FIG. 10 is a flow chart of yet another method for tracing an agricultural product.

FIG. 10 is a method of tracing a crop or agricultural product. The method of FIG. 10 begins in step S410.

In step S410, a crop processor obtains processing information for storage in a processor data processing system 434. The processing information concerns one or more processing steps or procedures for performance by the crop processor. For example, the processing information may concern any of the following: the production of a final agricultural product, the production of an intermediate agricultural product, the production of a final crop product, the processing of a packaging identifier for the final agricultural product, nutritional content, labeling requirements, safety compliance, and regulatory compliance. In one embodiment, the crop processor may receive one or more containers of the harvested crop which represents the raw material for a procedure. By application of various procedures, the crop processor may produce an intermediate agricultural product or a final crop product from the particular crop, a portion thereof, or an extract therefrom.

In step S411, the processor data processing system 434 receives a data profile from a power data processing system (310 or 410) or a supplier of the crop via a communication network 348 or link.

In step S412, an appender 438 or the processor data processing system 434 appends the obtained processing information to the received data profile or a portion of the received data profile to form a revised data profile.

In step S414, the processor data processing system 434 reads or collects a storage identifier (e.g., container identifier) for one or more storage volumes (e.g., containers) for holding the further processed crop or derivative thereof. The processor may store the particular crop or an agricultural product derived therefrom through the application of a production process. The processor may store the crop or a derivative thereof in at least one of a storage volume, a container, a segregated storage bin, and a portioned grain elevator.

In step S416, an assignment module 440 or the processor data processing system 434 associates the storage identifiers with the data profile for the particular crop.

In step S418, the processor data processing system 434 or a transmitter 346 associated therewith transmits at least a portion of the revised data profile to a data management system 350 to make the revised data profile available to a subscriber or user of the data management system 350. The subscriber or user of the data management system 350 may represent a potential recipient, potential user, potential purchaser, or a downstream member of the supply chain of the particular agricultural product, for example. The data management system 350 stores at least a portion of the revised data profile for later access by the processor data processing system 434 or a subsequent crop processor, manufacturer, retailer, or downstream recipient that receives the particular crop or a derivative thereof after the processor receives and processes the particular crop.

In one example, the user may represent a consumer, where the consumer is able to access at least a portion of the revised data profile or processing information for a final crop product that contains the particular crop via a subscriber terminal 352 and the communications network 348 or otherwise. In another example, the user may obtain the following information via a subscriber terminal 352 on a characteristic of the particular crop or a derivative thereof: an organic crop, an organically grown vegetable, an organically grown fruit, number two yellow corn, high oil corn, high starch corn, waxy corn, highly fermentable corn, white corn, nutritionally-enhanced corn, pest-resistant corn, corn resistant to corn earworms, herbicide resistant corn, non-genetically modified corn, and genetically modified corn, high protein soybeans, high oil soybeans, large soybeans, non-genetically modified soybeans, and genetically modified soybeans.

Figure 11:
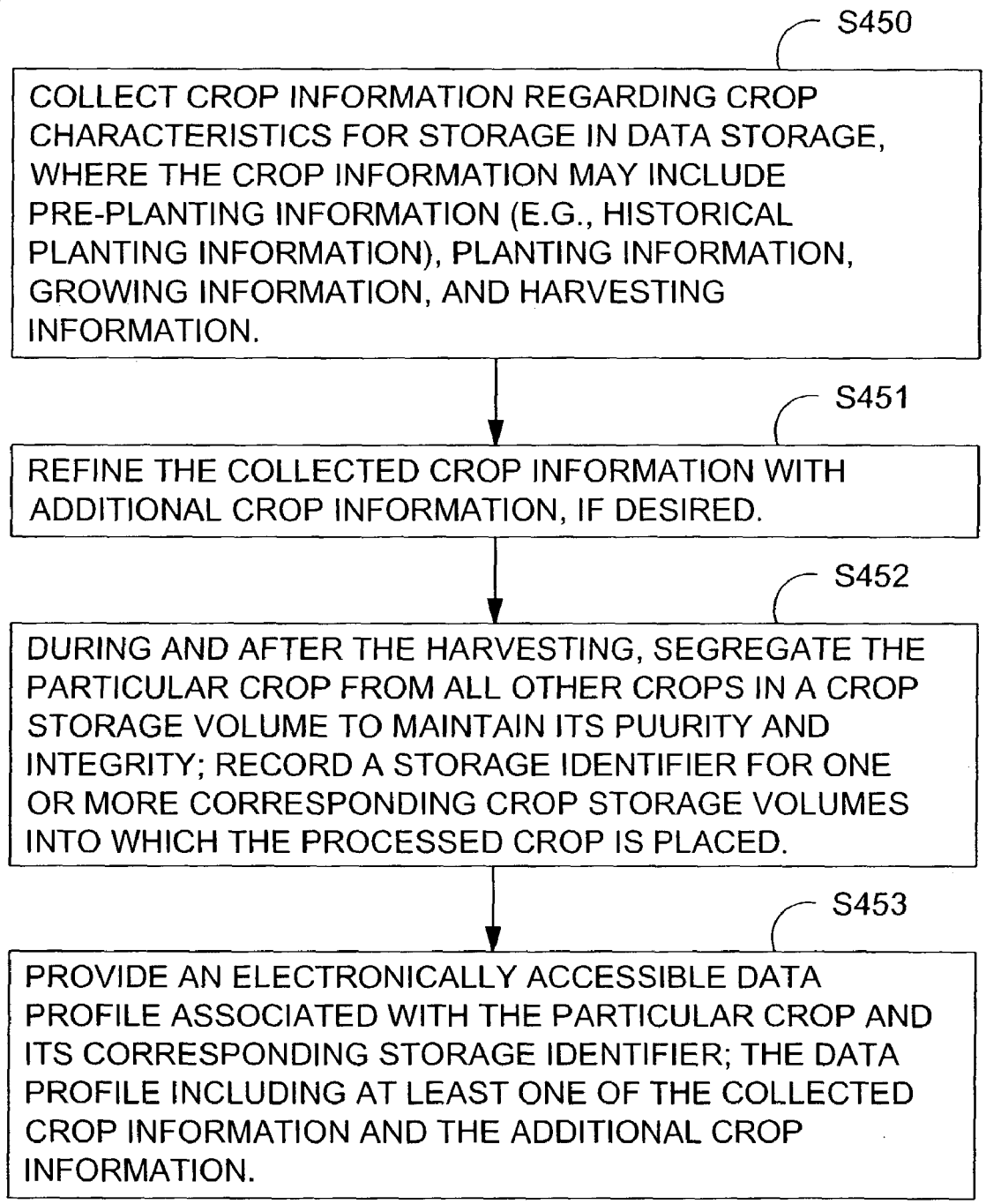
FIG. 11 is a flow chart of still another method for tracing an agricultural product.

FIG. 11 is a flow chart of a method for tracing a crop or an agricultural product. The method of FIG. 11 begins in step S450.

In step S450, a grower data processing system (310 or 410) collects crop information regarding crop characteristics and electronically stores the crop information in data storage 332. The grower data processing system (310 or 410) may collect the crop information during one or more of the following: pre-planting, planting, growing, and harvesting. The crop information may include pre-planting information, planting information, growing information, and harvesting information. Pre-planting information may include any of historical planting information, historical growing information, historical chemical application information, and historical harvesting information. In one example, seed or seed stock planting information is recorded contemporaneously with planting of the seed or stock. In another example, planting information, such as seed or seed stock and crop characteristics, is collected during or after the planting of a precursor to a particular crop and electronically stored in data storage.

In step S451, the grower data processing system 310 may, but need not, refine the collected crop information in accordance with several alternate techniques. In accordance with a first technique, the collected crop information (e.g., growing information, harvesting information or other information) is combined with previously collected or stored seed or seed stock planting information to create a data profile (e.g., collective data profile) in the data storage 332 for the harvested crop. Further, the previously stored seed or stock planting information may be recorded contemporaneously with planting the seed or stock planting information.

In accordance with a second technique, the collected crop information is refined to comprise collected planting information, collected harvesting information, and corresponding location information to provide the data profile for a particular crop based on a common geographic area or same location for the planting and harvesting of the particular crop. For instance, the recorded planting information from step S450 may be combined with recorded harvesting information in step S451 to form the data profile. The recorded planting information is associated with corresponding recorded planting location information, whereas the recorded harvesting information is associated with corresponding recorded harvesting location information. Planting location information is electronically recorded during or after the planting of a precursor to the particular crop. The harvested location information is electronically recorded during or after the harvesting of a particular crop. The planting location information is correlated to or substantially matches the harvesting location information for the defined geographic area associated with a particular crop (e.g., where a particular crop is grown) for a defined time span or growing season.

In accordance with a third technique, the harvested particular crop is analyzed to identify one or more crop characteristics (i.e., protein chains, identity tests, genetic tests or analysis results) and the analyzed crop characteristic information is appended into the data profile.

In accordance with a fourth technique, processing information (e.g., planting information) is appended to the data profile (e.g., collected crop information). The processing information regards one or more processing steps performed by the crop processor. For example, the collected crop information may be appended with the planting information to provide a data profile based on a common geographic area for the planting location information and the harvesting location information.

In accordance with a fifth technique, manufacturing information is appended to the data profile. The manufacturing information regards the production of a final crop product. For example, manufacturing information may comprise a packaging data, a packaging identifier, or a list of ancillary ingredients that are appended to the data profile of the final crop product.

In step S452, during and after the harvesting the particular crop is segregated from all other genetically distinct crops to maintain its purity and integrity. A storage identifier (e.g., container identifier) is recorded for one or more storage volumes (e.g., containers) into which the processed crop is placed and the storage identifier is associated with the data profile. For example, the particular crop is segregated by storing the particular crop in one or more segregated storage volumes for storing crop in a segregated manner. The segregated storage volumes or segregated storage means comprises a container, an inter-modal shipping container, a segregated storage bin, a portion of a grain elevator, or any other fixed or mobile container for holding a crop or agricultural product. Each segregated storage volume has a corresponding storage identifier (e.g., storage identifier 344) for identifying the segregated storage volume.

In one example, the segregation of the particular crop comprises maintaining the purity and integrity of the particular crop from all other genetically distinct crops by, contemporaneously with harvesting the crop, placing the crop in one or more intermodal freight containers as the segregated storage means, each intermodal freight container having a corresponding storage identifier (e.g., storage identifier 344). Further, the container identifier may be electronically collected contemporaneously with filling of the container with the harvested crop and electronically storing the container identifier in the data storage.

In step S454, the grower data processing system 310 provides an electronically accessible data profile (e.g., data profile 338) associated with the particular crop and a corresponding storage identifier (e.g., storage identifier 344), the data profile (e.g., data profile 338) including the collected crop information. For example, the grower data processing system (310 or 410) transmits or otherwise facilitates communication of the electronically accessible data profile from the grower data processing system (310 or 410) to a subscriber via one or more of the following: the data management system 350, the subscriber terminal 352, the communications network 348 (e.g., the Internet), and a processor data processing system 434. The subscriber may be a crop recipient of the harvested crop, a potential user of the harvested crop, a potential user of a derivative of the crop, or any other person authorized to receive or access at least a portion of the data profile.

In one example, the data management system 350 or holder of the data profile transmits at least a portion of the data profile to a crop processor, where the crop processor receives at least one of the one or more containers with the harvested crop therein. In another example, the data management system 350 electronically transmits the data profile to one or more potential users (e.g., subscriber terminals 352) of the harvested crop to facilitate sales to, acquisition by, delivery to, or process control of the harvested crop by a user. In accordance with yet another example, the data management system 350 manages a database or data storage device 351 that collects processing information regarding one or more processing steps performed on the harvested crop and combines the processing information into the collective data profile for access by one or more subscribers. In accordance with a further example, at least one container that contains the harvested crop, a derivative of the crop, or a final crop product is delivered to a crop user and at least a portion of the data profile is available to the recipient or user (e.g., crop processor) of the crop or agricultural products in the container or containers. In accordance with yet another example, at least a portion of the data profile is provided to a consumer of the final crop product.

Figure 12:
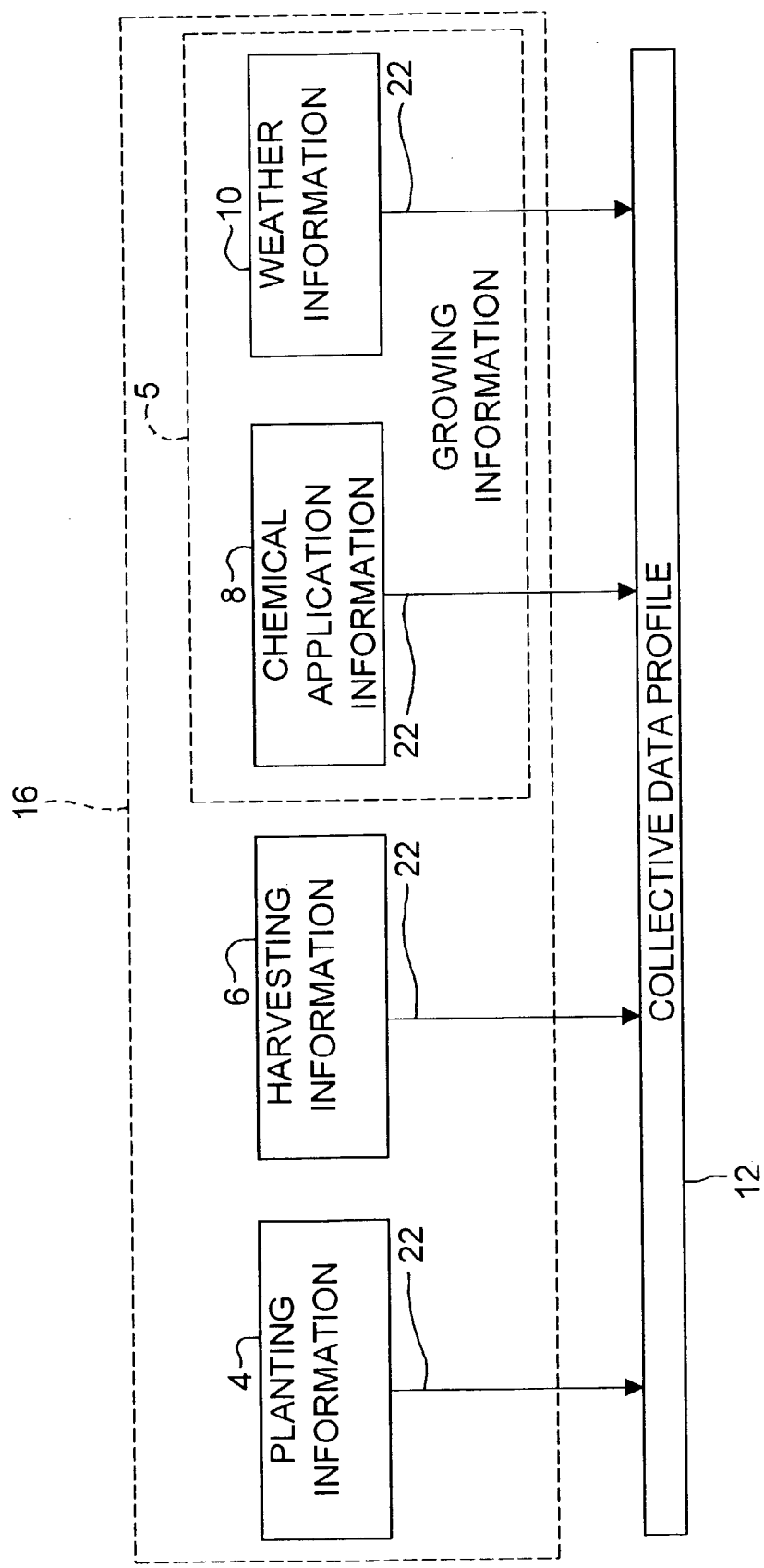
FIG. 12 is a schematic diagram of the various types of production information that may be combined to produce the data profile (e.g., a collective data profile).

The creation of the collective data profile is shown schematically in FIG. 12. Although the planting information 4 may be gathered during the planting operation or substantially contemporaneously therewith to promote accuracy of the planting data, the planting information may be gathered before, during, or after the planting operation and stored in a database. Likewise, harvesting information 6, growing information 5, and chemical application information 8 may be collected during the performance of these operations or substantially contemporaneously therewith. Nevertheless, harvesting information 6, growing information 5, and chemical application information 8 may be collected before, during, or after the performance of those operations. Weather information 10 is collected throughout the growing season from the nearest weather station (e.g., via a data feed) and/or collected at the field. The planting, growing, harvesting, chemical application and weather information are related to the production of the crop, and are grouped in the "producer box" 16. The various types of producer information are combined, as shown by arrows 22, to create the collective data profile 12 for the harvested crop.

In one embodiment, the planting information and harvesting information are combined with one another to provide the collective data profile based on geo-reference location information recorded during the planting of the seed and during harvesting of the crop. Other crop production information that can be recorded and combined into the collective data profile include any fertilizer, insecticide, herbicide or other chemical applied to the field, before, or after planting of the seed, mechanical soil treatment and weather conditions at the field location or the nearest weather substation.

The information is preferably collected by an information collection system that automatically records the planting and harvesting information, the storage identifier (e.g., container identifier) and other information. The data collection may be automated and integrated into the applicable agricultural machinery 311 to facilitate accurate collection of data with minimal human intervention and effort. In one example, location determining receiver (a GPS receiver) and one or more sensors are used during at least one of planting, growing and harvesting. The sensor or sensors may be mounted on planting, spraying or harvesting machinery and may provide data output via a databus, an analog output, a digital output, or machine electronics.

In a first example, a tractor and planting machinery may be equipped with a planting information input device, a location-determining receiver, and a clock for gathering planting information (e.g., a machine setting data available via machine electronics for seed density, seed spacing, and planting depth) versus location data for a measured time and determined calendar date. In a second example, a tractor and a spraying implement may be equipped with a growing information input device (e.g., spraying rate measurement device, a flowmeter, or a fluidic volume detector and timer), a location determining receiver, and a clock for gathering growing information versus location data for a measured time and determined calendar date. In a third example, a harvester, mower, or combine may be equipped with a harvesting information input device (e.g., yield monitor or moisture detector), a location-determining receiver, and a clock for gathering harvesting information versus location data for a measured time and determined calendar date. For a defined range of calendar dates that are associated with a growing season for a particular crop, the location data from planting, harvesting, and growing the particular crop may be correlated or matched to assign the collected information (planting information, growing information, and harvesting information) to a geographic area, a field identifier, a sub-field identifier, a grower identifier, or any combination of the foregoing.

Barcode readers and radio frequency tag readers may be used for data collection to output data into a grower data processing system (310 or 410) associated with agricultural machinery 311, a data management system 350 or otherwise. Barcodes and barcode readers support collection of data inputs by reading barcodes associated with storage volumes (e.g., containers), seed packages, chemical packages, and other agricultural input. Radio frequency (RF) tags and readers facilitate collection of data inputs associated with storage volumes (e.g., containers), seed packages, chemical packages, and other agricultural input.

Sample planting information 4 is shown in FIG. 13. The planting information shown in FIG. 13 or other planting information may be stored in computer memory (e.g., of a grower data processing system (310 or 410)), displayed on a display (e.g., of a grower data processing system (310 or 410)), saved to a file, saved in data storage device 351, or printed by a user transferred to downstream supply-chain members or otherwise processed. The user interface 316, the planting information input device 416, the sensor input 318, the machine electronics 320, a reader 324 or another data input 312 support the gathering of planting information 4. The information in the left-hand column includes the farm, the field and the task performed. The seed information includes the source, the variety and the lot number of the seed bags. The user may employ the reader 324 or a container identification device 424 to read or otherwise collect seed information from seed packages. Also shown is the date and time when the seed is loaded into the planter, the seed quantity and the chemical applied at planting. The user may employ the reader 324 or a container identification device 424 to read or otherwise collect chemical information or part of the chemical application information 8 from the chemical package or container. In this example and as described herein, chemical information for chemicals applied during planting are part of the planting information 4. The chemical information 8 (FIG. 12) relates to chemicals applied before or after planting.

Sample harvesting information 6 is shown in FIG. 14. The harvesting information shown in FIG. 14 or other harvesting information may be stored in computer memory (e.g., of a grower data processing system (310 or 410)), displayed in a display (e.g., of a grower data processing system (310 or 410)) presented by a user, saved to a file, saved in a data storage device 351, transferred to downstream supply-chain members or otherwise processed. The user interface 316, the harvesting information input device 420, the sensor input 318, the machine electronics 320, or other data inputs 312 support the gathering of harvesting information 6. For example, the harvested information 6, such as yield moisture, machine settings, and damage, may be provided via machine electronics of the agricultural machine or via any of the following sensors: a moisture sensor, a capacitive moisture sensor, a yield sensor, a piezoelectric yield sensor, and a piezoelectric force detector. The farm, field and task are shown in the left-hand column of FIG. 14. The crop type, corn, is shown together with the time and date that the combine grain tank is unloaded. Also included are the yield, the crop condition, i.e. moisture and damage, and various combine machine settings.

In the sample information of FIGS. 13 and 14, the location is shown as the "North field." More precise location information can be specified, such as the location in the field where the seed is planted from each loading of seed into the planter. The gathered location data or the location in the field may be expressed in terms of longitude and latitude with accuracy capable of being expressed to some tolerance in seconds, fractions of minutes, or fractions of seconds. In one embodiment, the location data is generated from a location determining receive signals (Global Positioning System (GPS) signals) received by a location-determining receiver or a data processor associated therewith on the machinery performing the planting, harvesting, or other agricultural operations. The farm, field, and tasks column may be manually entered by a user via the user interface, for example.

Once harvested, the crop is placed in one or more storage volumes (e.g., containers) each having a container identifier. Storage volumes refer to any volume for storing a crop, including, but not limited to, segregated bins in grain elevators, segregated storage silos, segregated containers, containers, and inter-modal shipping containers, where segregated means that the storage volumes have been dedicated to the storage of a particular crop or have been cleaned to remove plant matter and any other unwanted debris after storing another crop having a distinct differentiated characteristic or crop attribute. The data profile is associated with each farm container identifier such that the container identifier can be used to access the collective data profile. This association is shown in FIG. 14 where, for each of the three times the combine is unloaded, the identifier is shown for the container into which the crop is placed. The crop from the first two unloadings is placed in container 470-2465 while the crop from the last unloading is placed in container 470-6115. In one embodiment of the invention, the crop is placed into the one or more containers without first accumulating the crop in a bulk unit larger than the capacity of the containers into which the harvested crop is placed. After the harvested crop is placed into a container, the container is delivered to a crop processor or other user. By transporting the grain in a container, handling induced crop damage is minimized.

When one or more containers of crop are delivered to a crop processor, the processor can access all or part of the data profile. All, or part, of the collective data profile of the crop in the container is made available to the processor or user. The data profile can be transferred to the processor electronically, directly, via a computer network, such as the Internet, or by physically storing the information on the container for delivery with the crop. The producer may control access to the data and provide access by the processor to as much of the information as the producer desires to release. The processor can use the information to plan and optimize the processing of the crop by knowing specific attributes of the crop in each container.

Figure 15:
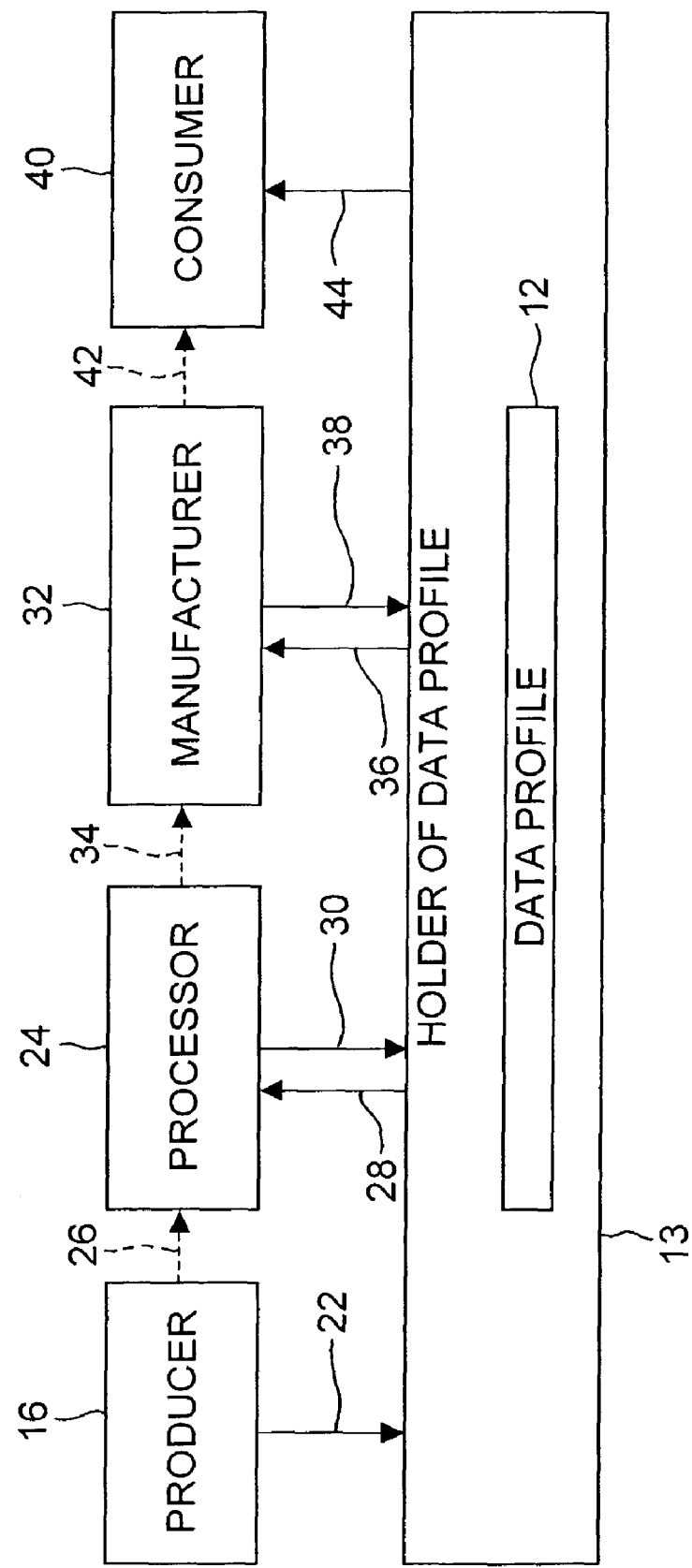
FIG. 15 is a schematic diagram of producer, processor and manufacturer collecting and adding information to the data profile and delivery of all or part of the data profile (e.g., collective data profile) to a consumer.

The crop tracing method of the present invention can extend beyond the production stage as shown in FIG. 15. Downstream processing and manufacturing information involving the crop is collected and added to the collective data profile 12. In FIG. 15, dashed arrows 26, 34, and 42 indicate the flow of the crop, an agricultural product, or a derivative thereof; the solid arrows 22, 28, 30, 36, 38 and 44 indicate the flow of data between various parties and a holder of a collective data profile 12. The holder 13 of the collective data profile or data profile 12 may be controlled by one or more of the following: the producer 16, the processor 24, the manufacturer 32, the consumer 40, a government, a governmental agency, and a third party. The processor 24 receives one or more containers of the crop as shown by the arrow 26. The processor 24 accesses all or part of the data profile 12 as shown by the arrow 28. Although the producer 26 could directly provide planting information, growing information, and harvesting information to the processor, the holder of the data profile can readily distribute, publish, or transmit the data profile on behalf of the supply chain members. Further, the holder can compare data inputted from different supply chain members on the same particular crop for accuracy, consistency, and fraud oversight and detection.

Information regarding processing steps performed on the crop received in a given "farm container". The processor adds or appends the collected information to the collective data profile as shown by the arrow 30 (FIG. 15). The processor data processing system 434 facilitates data collection and gathering of the information. The processed crop is ultimately placed into one or more "processor containers" each having an identifier. The processor container identifier is also associated with the data profile 12. The processed crop can be delivered to further processors (not shown) that access the data profile and add further processing information to the data profile in the same manner as described above with the processor 24.

Sample processing information is shown in FIG. 16. The processing information shown in FIG. 16 or other processing information may be stored in computer memory (e.g., of a processor data processing system 434), displayed on a display (e.g. of a processor data processing system 434), printed by a user, saved to a file, saved in data storage device 351, transferred to downstream supply-chain members, or otherwise processed. The processing information begins with the farm container identifier through which the data profile of the harvested crop is accessed. The source of the crop and the date and time-in at the processor is provided. Processing information about the processing steps, in this example, drying, cleaning and grinding, together with the date and time-out are collected and added to the data profile 12. The processed crop is placed in one or more "processor" containers and the container identifiers are recorded. In the example illustrated, the crop from one farm container, 470-2465, is processed and placed into two processor containers, ABC-4624 and ABC-6735.

With reference again to FIG. 15, the processed crop is delivered to a manufacturer 32 as shown by the arrow 34. The manufacturer, or processor, 32 uses the processed crop in the manufacture of a final crop product. The manufacturer, by using the processor container identifier, can access all or a part of the collective data profile as shown by the arrow 36. Manufacturing steps performed on the processed crop are recorded and added to the collective data profile as shown by the arrow 38. The manufacturer places a manufactured product in one or more containers having an identifier. At this point, the container may be a retail sales package and the identifier may be the UPC barcode, a date of manufacturer and/or a lot number. The date of manufacture and the lot number may be part of the barcode. Multiple packages may bear the same identifier as having common ingredients and manufacturing steps, date and lot number. A unique package identifier may be embedded in an electronic, RF tag on the package. Such identifiers are also known as an "electronic product code" and the tag also known as a "smart tag."

FIG. 15 shows a single processor 24 that processes the crop and a single manufacturer 32 that makes the final crop product. There may be multiple processors. The manufacturer may also be considered a processor. Furthermore, there may be only one processor that receives the crop product from the producer 16 and manufactures the final crop product. The claims should be interpreted as broadly as possible to cover any number of processors/manufacturers between the producer 16 and consumer 40 of the final crop product.

Figure 17:
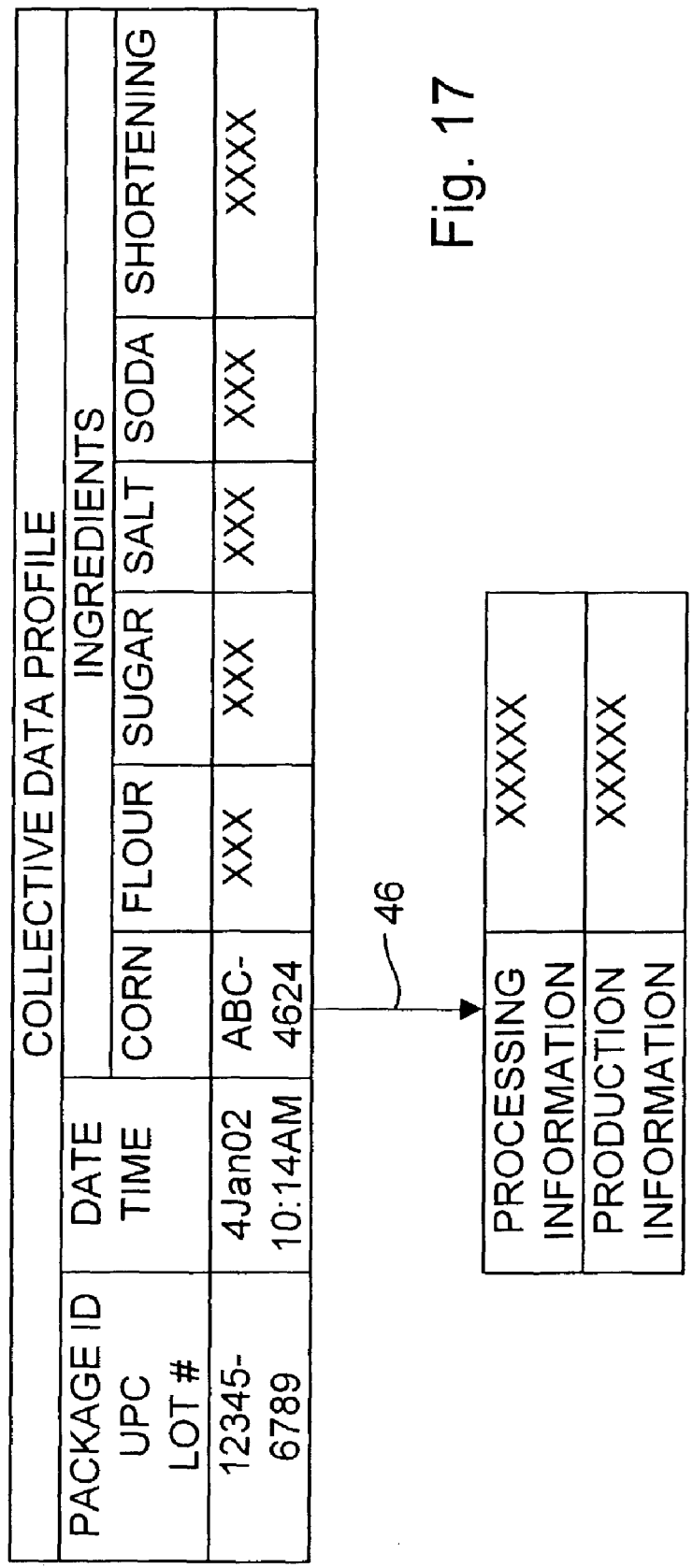
FIG. 17 is an example of a filtered or selected portion of the data profile as it may be displayed on a display.

The packages are delivered to a consumer as shown by the arrow 42. This may be through a retail sales outlet. By using the package identifier, the consumer can access all or a part of the collective data profile as shown by the arrow 44. This access may be via a terminal at the retail outlet, via a personal computer using a network, such as the Internet, etc. A sample data profile 12 is shown in FIG. 17 as it may be presented to a consumer (e.g., in a display of a subscriber terminal 352) or another person downstream from a crop processor. The data profile 12 may include the information added by the manufacturer to form a revised data profile or a data profile. In the example, the product is a corn bread mix containing the processed corn crop, flour, sugar, salt, soda and shortening. Each ingredient is listed. The processor container identifier in which the manufacturer received the corn identifies the corn.

By "clicking" on "corn," the production information and processing information about the corn is shown as indicated by the arrow 46. All of the corn crop production and processing information may be shown at once, or in further screen displays by clicking on various embedded links.

Figure 18:
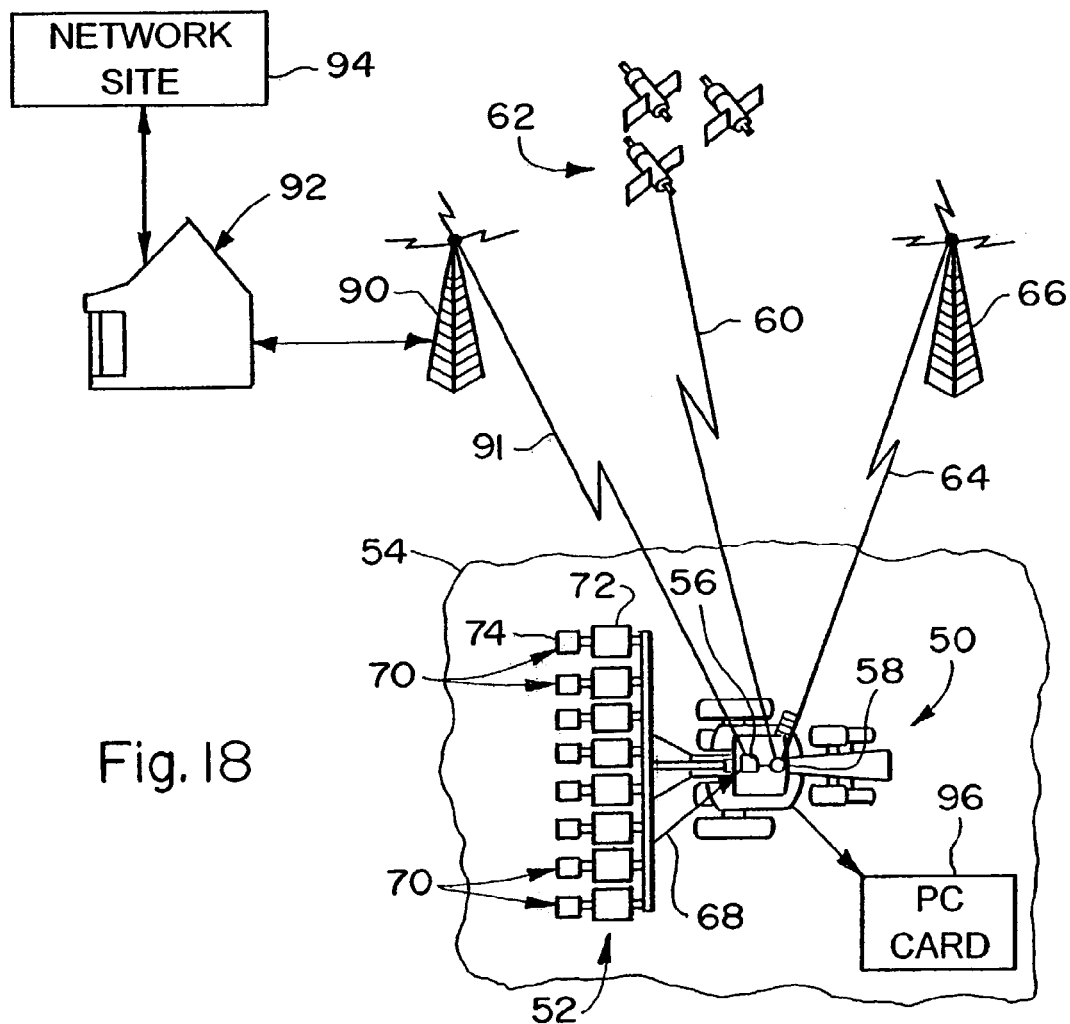
FIG. 18 is a schematic illustration of information collection during a planting operation.

With reference to FIGS. 7-10, an example of data collection by the producer 16 is shown in greater detail. In FIG. 18, information collection from the planting operation is shown. A tractor 50 is pulling a planter 52 through a field 54. The tractor 50 has an onboard computer 56 that receives, processes and stores the planting information. The tractor 50 includes a position receiver 58 that receives signals 60 from GPS satellites 62 and/or signals 64 from one or more ground based differential GPS transmitters 66. The computer determines the location of the tractor from the received signals.

Planter machine settings, such as the seeding rate, row spacing, etc. are collected and received by the computer 56 as shown by the arrow 68. The planter settings can be manually entered into the computer by the operator or collected by sensors onboard the planter and transmitted either by wire or by wireless connection to the computer 56. The planter 52 has a plurality of row units 70, each having a seed hopper 72 and a chemical hopper 74. The planter 52 is shown as an exemplary planter. Any of a variety of planter types can be used with the present invention. As shown, the planter 52 is an implement pulled by the tractor 50. The planter and the tractor are collectively referred to as a "planting machine." Alternatively, the planting machine may be a self-propelled vehicle.

Figure 19:
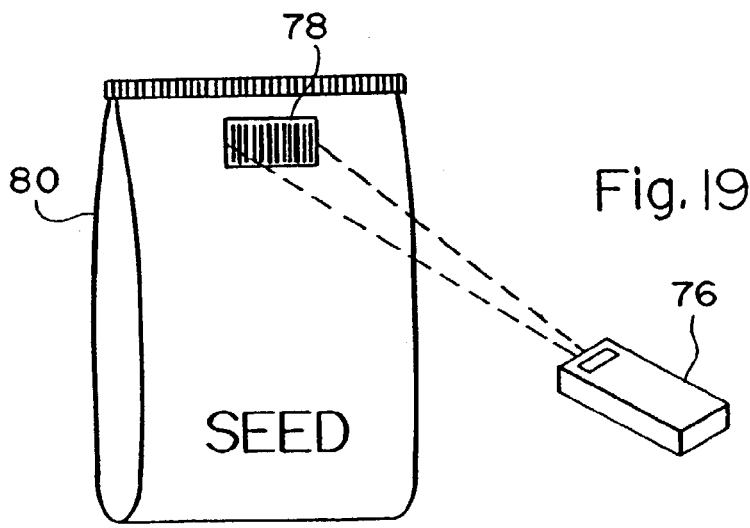
FIG. 19 is a schematic illustration of one method of collecting seed information or other planting or pre-planting information.

With reference to FIG. 19, data regarding the seed planted may be captured by a handheld data reader 76, such as a barcode reader, used to scan a barcode 78 on a seed bag 80. The barcode 78 contains information about the seed, in particular, the seed variety and other information that may be placed in the barcode by the seed producer. The barcode of the seed bag 80 is read by the barcode reader 76 prior to or at the time that the seed is placed into one of the hoppers 72 of the planter. The information collected by the reader 76 is downloaded to the computer 56. The producer 16 can also use the reader 76 to collect other planting or other production information. Other types of data collection devices can be used in place of the optical barcode reader. One alternative is radio frequency (RF) tags and readers. The method of the present invention is not limited to the use of any particular data collection device.

Figure 20:
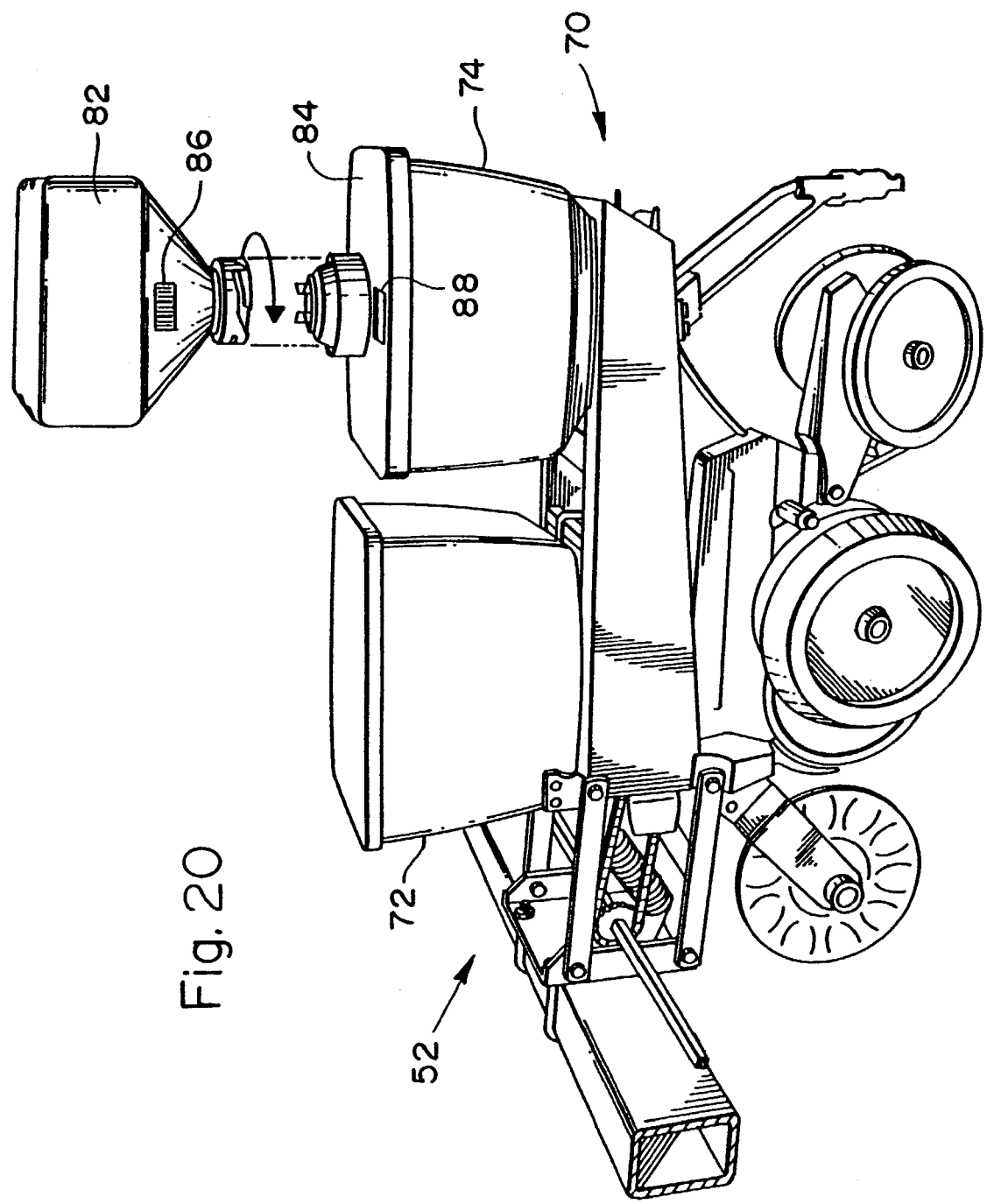
FIG. 20 is perspective view of a row unit of a planter illustrating an alternative method of collecting seed information.

With reference to FIG. 20, an automated information collection system is shown, as opposed to a manual collection system of FIG. 19. In FIG. 20, a fertilizer container 82 is shown just prior to being attached to the lid 84 of the fertilizer hopper 74 to load the fertilizer into the hopper 74. The container 82 includes a barcode 86 identifying the contents of the container 82. A barcode reader 88 fixed to the hopper lid 84 scans the barcode 86. The barcode information is then transferred to the computer 56.

Returning to FIG. 18, the information collected via the computer 56, i.e. the seed information, the fertilizer or other chemical information, the planter settings, the location, as well as date and time are transmitted via a wireless connection to a receiver 90 and then to a farm office 92. The information can be stored in a database at the farm office and/or transmitted to a network site 94 operated by an information service provider. The network site allows others to access the information as described herein. The Internet is a suitable network to access the information.

As an alternative to a wireless data transfer from the tractor to the farm office 92, the information from the computer 56 can be stored on a PC card 96 (FIG. 18) or other portable device on the tractor 50. At the end of each day, or the end of the planting operation, or the end of any other time period, the PC card 96 is removed from the tractor and delivered to the farm office 92. There, the information on the PC card 96 is downloaded and stored in a database and/or transferred to the network site 94.

Figure 21:
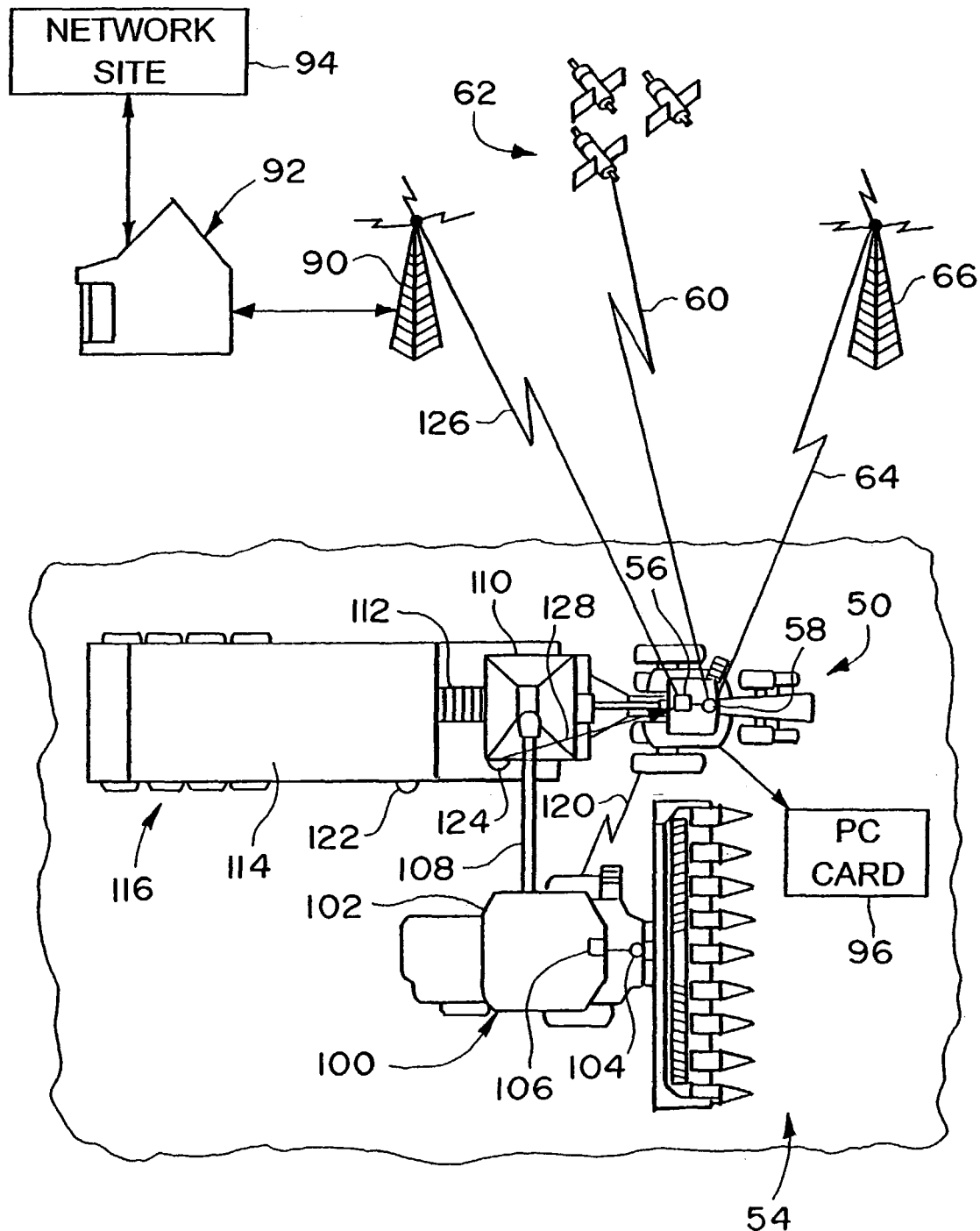
FIG. 21 is a schematic illustration of information collection during a harvesting operation.
Figure 22:
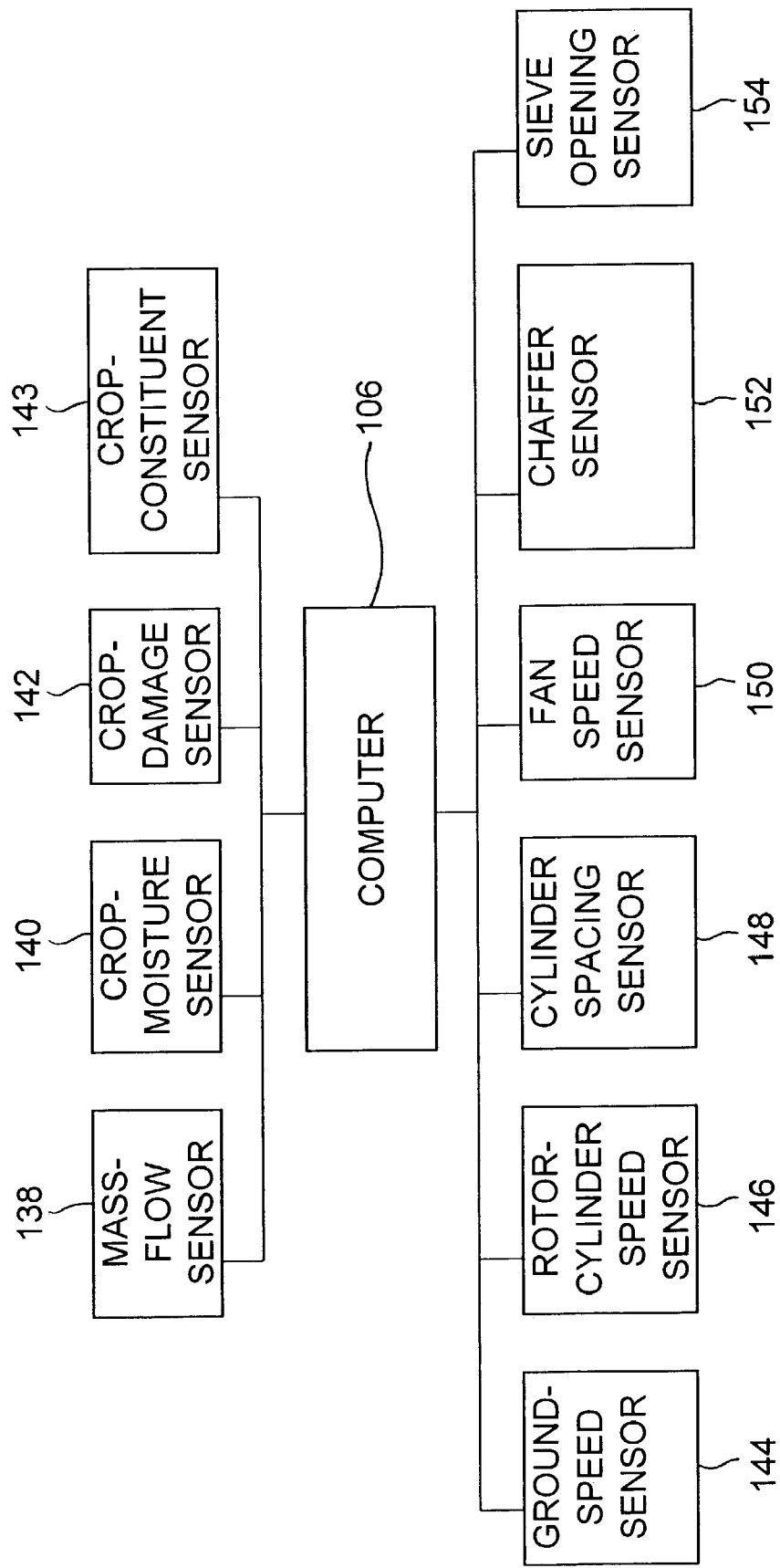
FIG. 22 is a schematic illustration of a combine information collection system.

With reference to FIG. 21, information collection from a harvesting operation is shown. After the crop has grown to maturity, a harvesting machine, such as a combine 100, is used to harvest the crop. The harvested crop is temporarily stored in the combine grain tank 102. The combine 100 has a position receiver 104 that receives signals 60 from GPS satellites 62 and/or the differential GPS signals 64 from transmitter(s) 66. Information regarding the location of the combine while the crop in the grain tank is harvested is temporarily stored in a combine computer 106. Sensors on the combine connected to the computer 106 are used to collect additional information. FIG. 22 schematically shows a representative combine information system with a mass-flow sensor 138, a crop-moisture sensor 140, a crop-damage sensor 142 and a crop-constituent sensor 143 all connected to the computer 106. These sensors collect information about the harvested crop including the yield and measures of particular constituents of the crop, such as, but not limited to, oil, sugar and/or starch content. Additional sensors collect harvesting machine component settings. These sensors include ground speed sensor 144, rotor or cylinder speed sensor 146, rotor or cylinder spacing sensor 148, fan speed sensor 150 and chaffer and sieve opening sensors 152, 154, all of which are connected to the computer 106. Any information available on the combine CAN bus can be collected and stored in the computer 106. Time and date information is also collected and stored. Information systems that monitor yield, moisture, combine settings, etc. are generally known. One such system is the GreenStar™ precision-farming system available from John Deere. The present invention is not limited to a particular type of information system. Information regarding any of a variety of crop characteristics or machine settings can be collected and is not limited to the example of FIG. 22.

The grain tank 102 is emptied via an unloading auger 108. As shown in FIG. 21, the grain is unloaded from the combine to a hopper 110. From the hopper 110, a conveyor 112 transfers the crop to a freight container 114. The hopper 110 and conveyor 112 are part of a container cart 116 used to transport the container 114 through the field 54. The tractor 50 tows the container cart. Exemplary container carts are shown in U.S. patent application Ser. No. 09/969,203 filed Oct. 1, 2001, assigned to the assignee of the present application and hereby incorporated by reference.

As the grain tank 102 is unloaded, the harvesting information stored in the combine computer 106 is transmitted wirelessly to the computer 56 on the tractor 50 as shown by the arrow 120. Any type of suitable wireless data transfer system can be used. Where multiple combines and tractors are operating in the same field, GPS location information from both the combine and the tractor ensure that the tractor receives harvest information from the same combine from which the crop is received.

The container 114 includes an RF tag 122 containing an identifier of the container 114. An RF reader 124 on the container cart 116 queries the RF tag 122 and receives a response therefrom that includes the container identifier. The reader 124 is coupled to the tractor computer 56, either wirelessly or by wire and transmits the container identifier as shown by the arrow 128.

The harvesting information relating to the crop deposited in the container 114, together with the container identifier, is transmitted wirelessly as shown by the signal 126 to the receiver 90. From there, the data is transferred to the remote farm office 92 for storage and/or uploading to the network site 94. Alternatively, information can be manually transferred to the farm office by PC card 96.

The harvesting information is combined with the planting and other production information based on the geo-reference location information. That is, the planting information for a given location is combined with the harvesting information for the same location. The combined planting information, harvesting information and other production information forms the collective data profile 12 for the harvested crop and is associated with the identifier for the container 114.

Other production information, including chemical application and mechanical soil treatments, both prior to and after planting, is collected in a similar manner as shown and described with the planting and harvesting information. Weather information during the growing season can be collected from the Internet or by other means, and added to the collective data profile at the farm office 92.

As shown and described with reference to FIG. 21, the harvesting information is transferred from the combine 100 to the tractor 50 pulling the container cart 116. Alternatively, the computer 56 can be located on the container cart 116 or the combine computer 106 could be used to receive, store and transfer information to the farm office 92.

FIG. 21 illustrates the harvesting operation with the crop being loaded into a freight container from the combine. Another practice is to discharge the crop from the combine into a grain cart for transport away from the field and deposit into a storage device. The present invention can be used in such a harvesting operation as shown in FIG. 23. The harvesting information is transferred from the combine 160 to the tractor 50 pulling the grain cart 158 when the combine grain tank is unloaded. The line 160 shows the information transfer.

When the grain cart 158 is unloaded, as shown in FIG. 24, the harvesting information is transferred from the tractor 50 computer 56 to another computer 156 of a tractor 162. Tractor 162 is used to operate a container loader 164 that receives the crop from the grain cart 158 and loads the crop into a container 166. The container loader 164 is shown in more detail in U.S. patent application Ser. No. 09/970,235 filed Oct. 1, 2001, assigned to the assignee of the present application and hereby incorporated by reference. The container 166 has an RF tag 168 with a container identifier. The RF reader 172 on the loader 164 queries the RF tag 168. When the crop is transferred from the grain cart 158 to the container 166, the identifier of the container is captured and transmitted to the tractor computer 156 as shown by arrow 174 for association with the collective data profile 12. The harvesting information is then transferred to the farm office 92 in the same manner as previously described. Each time the crop is transferred from one vessel to another, the time and location is recorded to enable association of the data profile with the container identifier of the container that ultimately receives the crop. It will be appreciated that alternatively, the container identifier could be transmitted to the computer 56 on tractor 50 and from there, the harvest information is transferred to the farm office. Again, the information may be manually transferred to the farm office by a PC card.

The collective data profile can be stored and maintained at the farm office 92. The producer can use the data profile for farm management, to market the crop and/or to verify contract or certification compliance.

In a preferred embodiment of the invention, the collective data profile is stored and maintained by an information service provider that operates the network site 94. There, the data profile can be readily accessed through the network, such as the Internet, by the downstream processors and manufacturers. The processing and manufacturing information is easily added to the data profile 12 at the network site 94.

Figure 25:
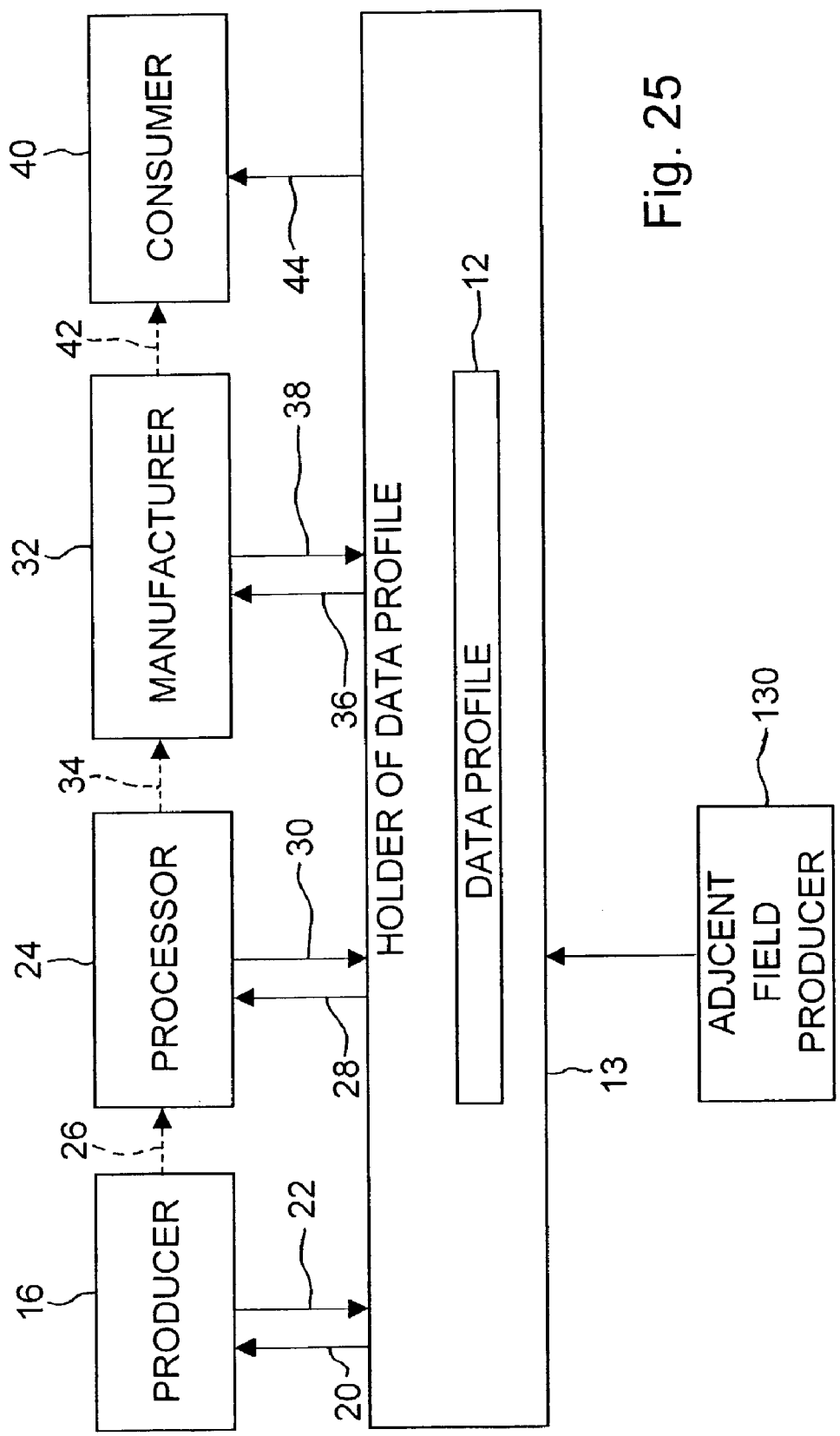
FIG. 25 is a schematic diagram similar to FIG. 15 showing the addition of adjacent field information to the collective data profile.

In addition to the producer information described above in connection with a crop, adjacent crop information regarding a crop grown in an adjacent field can also be added to and become part of the collective data profile. Information, such as chemical application and/or seed variety of an adjacent crop may be of interest for contract or certification requirements where spray drift or cross pollination are undesired. If the fields adjacent to field 54 are farmed by the same producer 16, the data management software at the farm office can be programmed to add selected information of the adjacent crop into the data profile for the crop from field 54.

Where the adjacent field is farmed by a second producer 130 (FIG. 25) that utilizes the same information service provider as the first producer 16, the second producer 130 can grant to the producer 16 access to a portion of the collective data profile for the crop from a field adjacent to the field 54. The accessed information is added to the collective data profile of the crop produced in field 54. The addition of the adjacent field information into the data profile 12 is shown schematically in FIG. 25.

Figure 26:
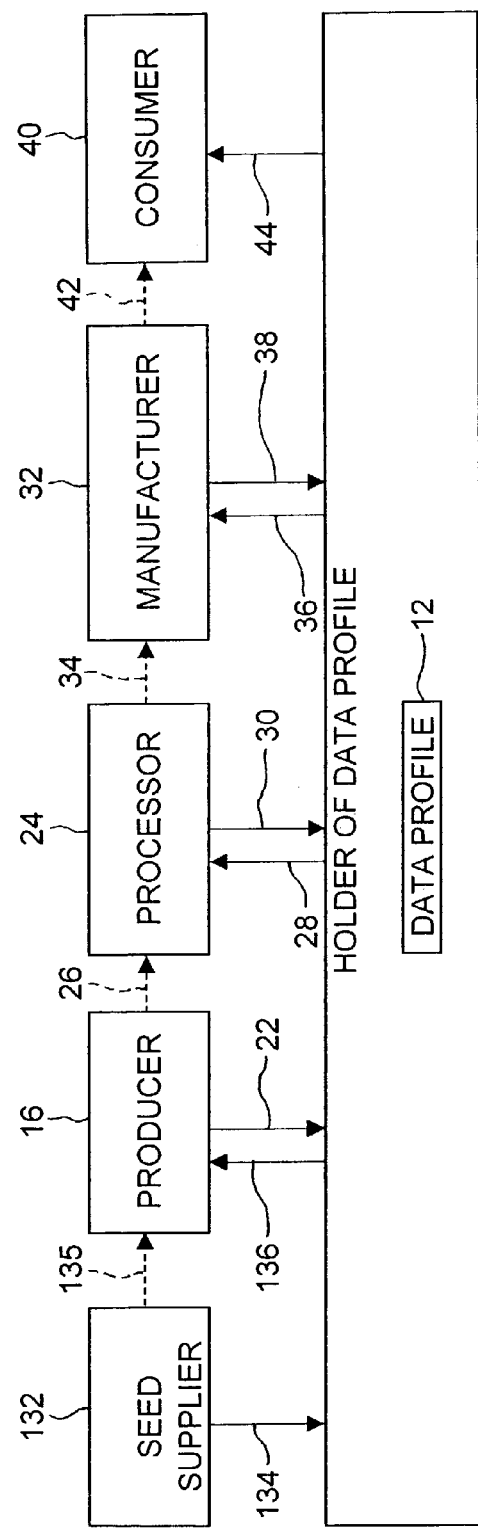
FIG. 26 is a schematic diagram similar to FIG. 15 showing the addition of seed production information to the data profile and use of the seed information by the producer.

Additional seed information can be included in the data profile as shown in FIG. 26. Seed production information such as the location, planting and harvesting dates, genetics, or other seed information, is collected or provided by a seed supplier 132. This seed information is added to the data profile as shown by the arrow 134. The seed supplier 132 or its agent transfers (e.g., delivers, ships, gives, or sells) seed or another form of a plant to producer 16 as shown by arrow 135. When the producer 16 scans the barcode, label, tag, or document associated with the delivered seed or another form of the plant, access to the seed information is obtained. For example, the producer may scan a barcode label on a seed bag to acquire a seed bag identifier and other seed information as indicated by the arrow 136.

Figure 27:
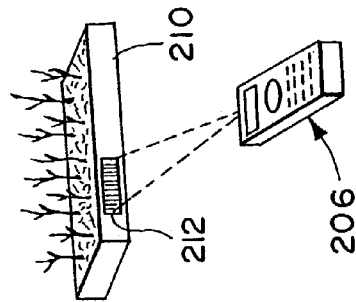
FIG. 27 is a schematic illustration of a method of collecting seed and pre-planting or planting information for individual transplants.
Figure 28:
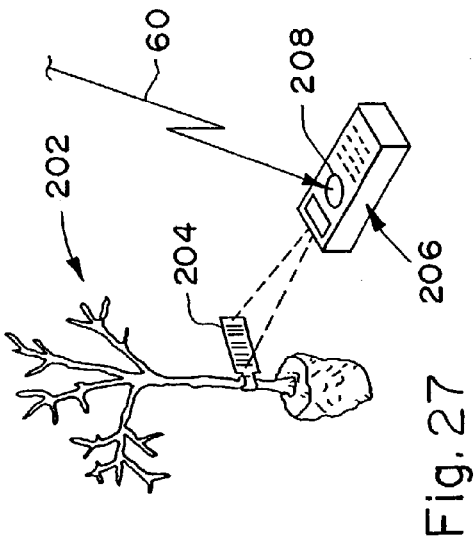
FIG. 28 is a schematic illustration of a method of collecting seed and pre-planting or planting information for a multitude of transplants.

With reference to FIG. 27, a collection of planting information is shown from an individual plant 202 that is to be transplanted. The tree 202 carries a barcode tag 204. At the time and place of planting, a barcode reader 206 reads the barcode. The reader 206 preferably also includes a GPS receiver 208 to receive GPS signals 60 identifying the location where the tree 202 is planted. Similarly, with reference to FIG. 28, a flat 210 with a plurality of small seedlings carries a barcode 212 which is scanned by the barcode reader 206 at the time and location where the seedlings are planted. A similar approach can be used for manually harvested crops, such as fruit, where location and weight information of each bag of fruit harvested by given person can be collected. The information may be collected using a hand held device that receives location information from GPS signals, by field number, or by the number of a particular tree. Weight information for each bag of fruit picked can be collected electronically from a scale as each bag is weighed.

Figure 29:
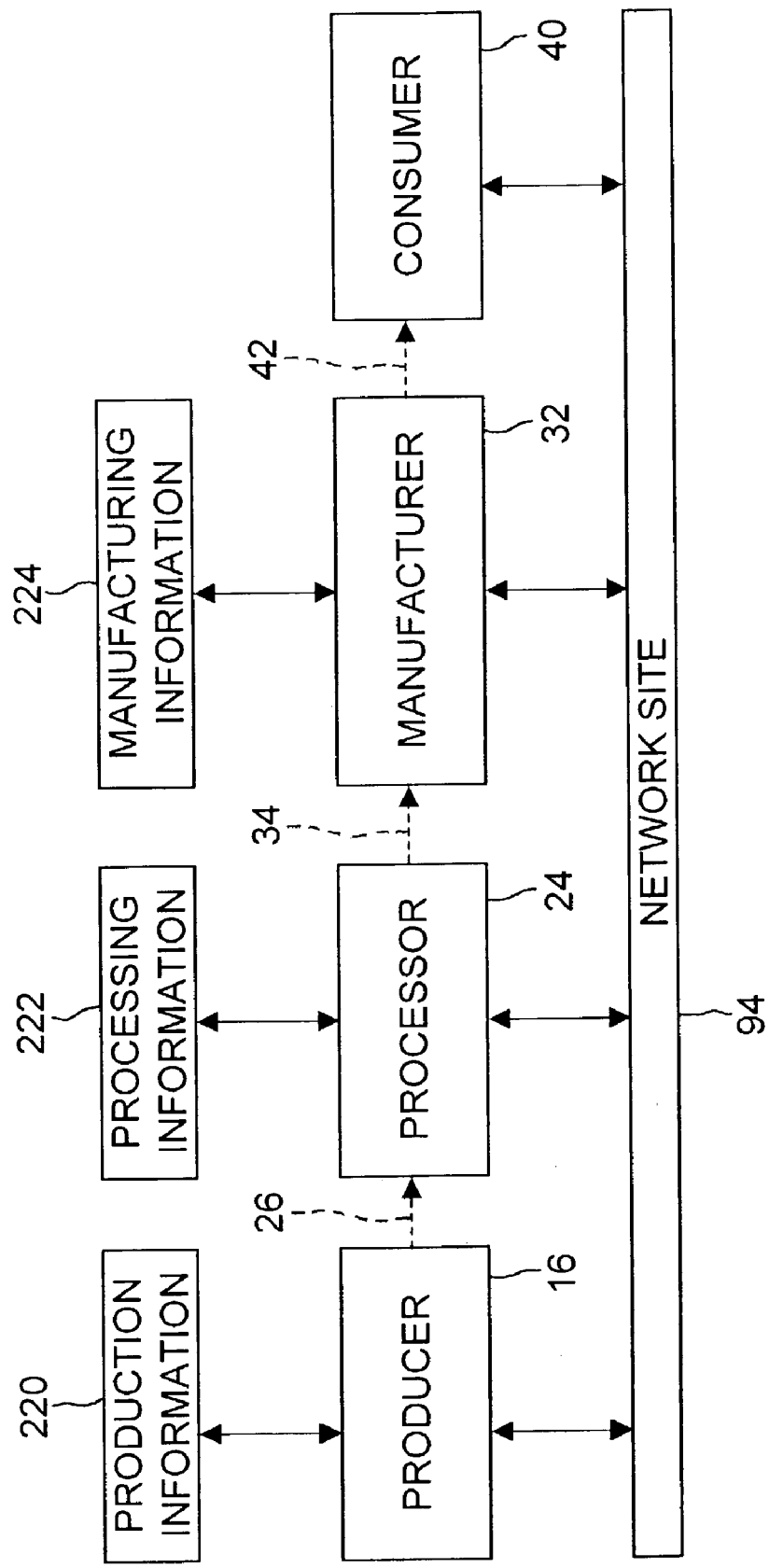
FIG. 29 is a schematic diagram of an alternative information delivery system.

FIG. 29 illustrates an alternative information delivery system. Here the producer 16 delivers the crop to the processor as shown by the arrow 26 and stores the production information regarding the crop in a data store 220. The data store includes the collective data profile of the crop including the planting and harvesting information associated with the container identifier used to deliver the crop to the processor. The producer also forwards the container identifier to the network site 94 for tracking purposes. If and when the processor desires the information from the collective data profile, the processor communicates with the network site and provides the container identifier for which information is desired. If the producer has already authorized this processor to receive information, the information may be immediately forwarded to the processor. If not previously authorized, the producer is notified and then provides access to all or a part of the data profile.

Likewise, the processor stores processing information in a data store 222 and delivers the processed crop to the manufacturer as shown by the arrow 34. The processor container identifier is associated with the processing information in the data store 220 and is forwarded to the network site for tracking purposes. The manufacturer 32, by utilizing the container identifier can request information from the processor through the network site 94 to gain processing information. The processing information may include the farm container identifier to enable the manufacturer to also request production information from the producer 16. Alternatively, the processor container identifier may be linked to the farm container identifier at the network site 94, enabling the manufacturer to seek information from the producer 16 directly, without first obtaining information from the processor 24.

The manufacturer likewise stores manufacturing information in a data store 224 and forwards the final crop product to the consumer 40 as shown by the arrow 42. The consumer 40 can then access the manufacturing, processing or production information in the same manner as described above. The information management system of FIG. 29 allows the producer, processor and manufacturer to maintain possession and control of their respective information. Varying degrees of access can be provided to the other participants and each participant may be allowed access to different amounts of the information.

Figure 30:
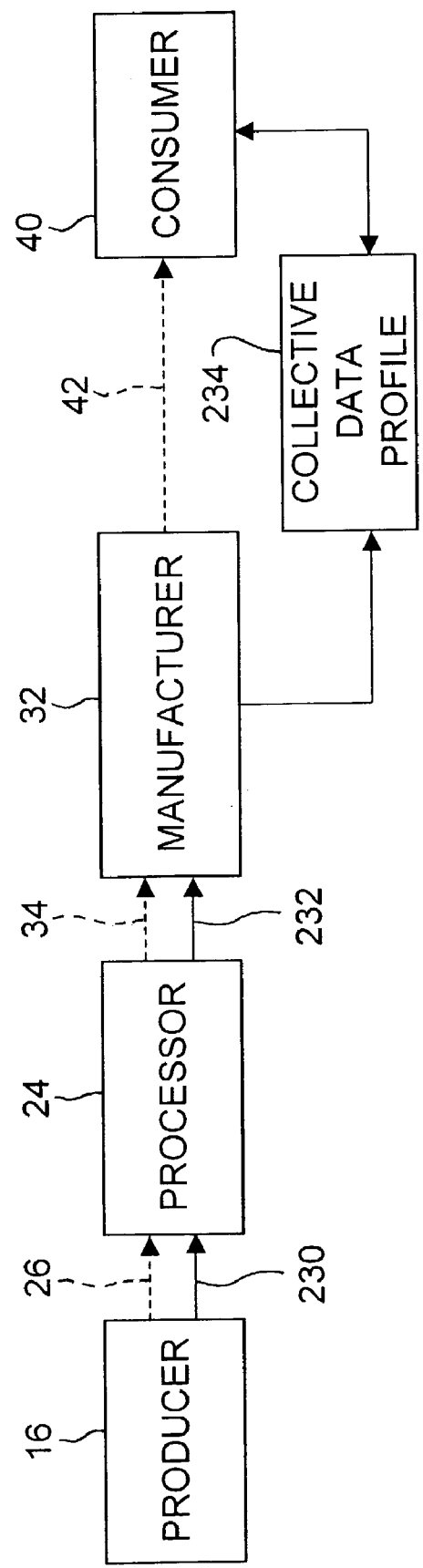
FIG. 30 is a schematic diagram of another alternative information delivery system.

FIG. 30 illustrates another alternative information distribution system. The producer 16 forwards the harvested crop to the processor, as shown by the arrow 26, and also delivers to the processor the collective data profile of the crop as shown by the arrow 230. The data can be transferred by a direct connection to the processor or through a network. The processor adds the processing information to the collective data profile received from the producer. The processed crop is delivered to the manufacturer as shown by arrow 34 and the collective data profile is forwarded to the manufacturer as shown by arrow 232. The manufacturer adds manufacturing information to the collective data profile and forwards the finished final crop product to the consumer 40 as shown by the arrow 42. The manufacturer can store the entire collective data profile on a network site 234 for access by the consumer 40. The information system shown in FIG. 30 differs from the information system in FIG. 29 in that each participant gives up possession and control of the their information.

In addition to receiving information from upstream participants in the supply chain, each participant may have access to information from downstream participants. For example, the seed producer may collect yield information from the producer 16 to evaluate the performance of various seed varieties.

The system and method of the present invention can be used to facilitate the marketing of a given crop. Once the crop is harvested and stored in a freight container, the producer 16 can advertise the availability of the crop, and distribute the data profile 12 containing the crop's attributes to a variety of potential purchasers. The collective data profile can also be used to certify compliance with either contract requirements or regulations established by governmental or certifying agencies for a particular crop.

While the invention has been described as having the computer 56 onboard the tractor 50, it will be appreciated that the computer may be onboard the combine, the container cart or the grain cart.

The method and system of the invention may pertain to any of various stages of agricultural production, distribution, transportation, handling, storage, processing, and consumption from the planting stage through harvest. The method and system can extend forward in time, to trace seed production prior to planting and later in time, to trace the harvested crop through processing stages and to the ultimate consumer, while providing crop identity and production information to the crop processors and to the consumer.

The method can also be extended beyond crop production information to include collecting processing and manufacturing information from downstream users of the crop. After processing, the processed crop is placed in one or more containers each having a container identifier that is electronically received and stored in the database and associated with the collective data profile. The above is repeated for subsequent processors with all or part of the collective data profile delivered to each downstream processor. The processed crop is ultimately delivered to a processor or manufacturer of a final crop product that also receives all or part of the collective data profile. Manufacturing information regarding the manufacture of a final crop product is electronically received and stored along with a packaging identifier for the final crop product. This information is also added to the collective data profile.

The consumer of the final product can use the packaging identifier, such as a UPC barcode, together with a production lot number, or a unique package identifier in an electronic product code embedded in an RF tag to gain access to all or part of the collective data profile. Access by the consumer can occur via a network, such as the Internet, using a personal computer or at a terminal in the retail outlet. The information may include an ingredient list, location where the crop ingredients were produced, and the chemicals, fertilizers, insecticide, etc. applied to the crop. One use of this information by the consumer may be to avoid ingredients, additives, chemicals, etc. to which the consumer may be allergic.

While the invention is largely described in the context of annual planting of a seed and harvesting a crop therefrom, the invention is not limited to any particular type of agricultural production. The method of the present invention can be used with perennial plants that are not planted for each harvest. Planting information from a perennial plant is collected at planting and stored for later use with each crop harvest to produce the collective data profile. In the case of existing perennial plants, plant variety, location and other planting information may be collected and stored electronically to generate the planting information for subsequent use of the methods of the present invention.

Having described the preferred embodiment, it will become apparent that various modifications can be made without departing from the scope of the invention as defined in the accompanying claims.

We claim:

1. A method of tracing a crop via data processing systems, the method comprising:
   collecting planting location data and seed or seed stock information for a particular crop during pre-planting or planting and prior to harvesting of the particular crop, the seed or stock information comprising at least one of source, variety, and lot number originating from a seed supplier and storing the seed or seed stock information in a first data storage associated with a first data processing system of an agricultural machine for planting, the collecting accomplished via a reader by reading at least one of an optically readable tag, a seed package label and a radio frequency tag;
   transferring the seed or stock information from the agricultural machine for planting to a remote data storage device remote from the first data storage;
   collecting harvesting location data and crop information regarding crop characteristics via a sensor and machine electronics of a harvesting machine and electronically storing the crop information in a second data storage associated with a second data processing system of the harvesting machine during or after the harvesting of the particular crop, the crop information comprising production data on moisture content of the particular crop and a machine setting of the harvesting machine associated with the particular crop;
   combining the collected crop information with the stored seed or seed stock planting information based on the location data to create a collective data profile in the remote data storage device for the harvested particular crop; and
   providing an electronically accessible data profile associated with the harvested particular crop via a subscriber terminal for communicating with the remote data storage device through a communications network, the data profile including the collected crop information to facilitate verification of a purchaser or a downstream user of the particular harvested crop that a desired attribute is present in the harvested particular crop, where the production data in the data profile in the remote data storage device comprises the moisture content of the particular crop and the machine setting of the harvesting machine.

2. The method as defined by claim 1 wherein the previously stored seed or seed stock planting information was recorded contemporaneously with planting of the seed or stock.

3. The method as defined by claim 1 further comprising:
   appending the collected crop information with the planting information to provide the data profile based on a common geographic area common to the planting location information and harvesting location information.

4. The method as defined by claim 1 further comprising:
   analyzing the harvested particular crop to identify one or more crop characteristics; and
   appending the analyzed crop characteristic information into the data profile.

5. The method as defined by claim 1 further comprising:
   segregating and maintaining the purity and integrity of the harvested particular crop from all other crops by storing the harvested particular crop in one or more segregated storage means for storing crop in a segregated manner, each segregated storage means having a storage identifier; and
   transmitting at least a portion of the data profile to a crop recipient, where the crop recipient receives at least one of the one or more segregated storage means with the harvested particular crop therein.

6. The method as defined by claim 1 further comprising:
   collecting in a database processing information regarding one or more processing steps performed on the harvested particular crop by a crop recipient and combining the processing information into the collective data profile.

7. The method of tracing a crop as defined by claim 1 further comprising:
   electronically transmitting the data profile to one or more potential users of the harvested particular crop.

8. A method of tracing a crop via data processing systems, the method comprising:
   collecting planting location data and seed or seed stock planting information for a particular crop during or after planting of the particular crop, the seed or stock planting information comprising at least one of source, variety, and lot number originating from a seed supplier, and electronically storing the collected planting information in a first data storage associated with a first data processing system of an agricultural machine for planting, the collecting accomplished via a reader by reading at least one of an optically readable tag, a seed package label and a radio frequency tag;

transferring the seed or stock planting information from the agricultural machine for planting to a remote data storage device remote from the first data storage;

collecting harvesting location data and crop information via a sensor and machine electronics of the harvesting machine during or after the harvesting and electronically storing the crop information in a second data storage of a second data processing system associated with the harvesting machine, the crop information comprising production data on moisture content of the particular crop and a machine setting of the harvesting machine;

segregating and maintaining the purity and integrity of the particular crop from all other crops by storing the particular crop in one or more segregated storage means for storing crop in a segregated manner, each segregated storage means having a storage identifier; and providing an electronically accessible data profile associated with the particular crop and a corresponding storage identifier via a subscriber terminal for communicating with the remote data storage device through a communications network, the data profile including the collected seed or seed stock planting information and the crop information for storage in the remote data storage device to facilitate verification of a purchaser or a downstream user of the particular crop that a desired attribute is present in the particular crop, where the production data in the data profile in the remote data storage device comprises the moisture content of the particular crop and the machine setting of the harvesting machine.

9. The method according to claim 8 wherein the segregating comprises:
maintaining the purity and integrity of the particular crop from all other crops by, contemporaneously with harvesting the particular crop, placing the harvested particular crop in one or more inter-modal freight containers as the segregated storage means, each inter-modal freight container having a corresponding storage identifier.

10. The method according to claim 8 further comprising:
electronically collecting the storage identifier contemporaneously with filling of a container, as the segregated storage means, with the harvested particular crop and electronically storing the storage identifier in the data storage.

11. The method as defined by claim 8 further comprising:
collecting crop information during harvesting of the particular crop;
combining the planting information and crop information to form the data profile, the planting information and the crop information including common location data during planting of the seed and harvesting of the particular crop.

12. The method as defined by claim 8 further comprising:
delivering at least one or more containers, as the segregated storage means, with the harvested particular crop therein to a crop user and making at least a portion of the data profile available to the user.

13. The method as defined by claim 8 further comprising:
delivering at least a portion of the data profile to a crop processor that receives at least one of the one or more containers, as the segregated storage means, with the harvested particular crop therein.

14. The method as defined by claim 13 further comprising:
appending processing information to the data profile, the processing information regarding one or more processing steps performed by the crop processor;
recording a container identifier for one or more containers into which the processed crop is placed; and
associating the container identifier with the data profile.

15. The method as defined by claim 14 further comprising:
delivering at least a portion of the data profile to a processor that receives at least one of the one or more containers of the harvested crop and produces a final crop product therefrom.

16. The method of tracing a crop as defined by claim 13 further comprising:
appending production information to the data profile, the production information regarding the production of a final crop product; and
appending a packaging identifier for the final crop product to the data profile.

17. The method as defined by claim 13 further comprising:
providing at least a portion of the data profile to a consumer of the final crop product.

18. A system of tracing a crop the system comprising:
a location-determining receiver adapted to be used during at least one of a planting and harvesting operation to receive signals for determining planting location data and a harvesting location data for the particular crop to define a defined geographic area for the particular crop;
a first data storage device for storing, in a first data storage associated with an agricultural machine for planting, at least one of crop information, planting information, and planting location data;
a second data storage device for storing, in a second data storage associated with an agricultural machine for harvesting, at least one of growing information, harvesting information, harvesting location data, chemical information, weather information, processing information, manufacturing information, and retail information related to the particular crop;
a reader for reading seed or seed stock planting information associated with at least one of an optically readable tag, a seed package label, and a radio frequency tag prior to harvesting of the particular crop, the seed or seed stock planting information originating from a seed supplier;
an arranger for arranging the stored information for the particular crop associated with the defined geographic area to provide a data profile for transfer or wireless transmission to a remote data storage device for the particular crop to facilitate verification of a purchaser or a downstream user of the particular crop whether a desired attribute of the particular crop is present based on the data profile, the remote data storage device remote from the first data storage device and the second data storage device, the data profile comprising the seed or seed stock planting information as the planting information and comprising other stored crop information on moisture content of the particular crop and a machine setting of the agricultural machine for harvesting as the harvesting information, the arranger grouping the planting information and harvesting information for the same geographic area, the same growing season and the same crop, the seed or stock planting information comprising at least one of source, variety, and lot number; and an assignment module for associating a storage identifier with the data profile for the particular crop, where the storage identifier identifies at least one of a container and a segregated storage bin for holding the particular crop for a tracked time duration, to facilitate verification of a purchaser or a downstream user of the particular crop whether a desired attribute is present based on the crop information.

19. The system according to claim 18 further comprising:
a data management system for making available at least a portion of the data profiles to a crop recipient that receives the particular crop; and
a transmitter for transmitting the data profile and its associated storage identifier to the data management system.

20. The system according to claim 18 further comprising:
at least one sensor for the collecting at least one of the harvesting information and the crop information about the particular crop during or after harvesting.

21. The system according to claim 18 further comprising:
a container identification device for obtaining a storage identifier of a storage volume that receives harvested crop.

22. The system according to claim 18 further comprising:
an information transfer device for transferring one or more of the following to a data processing system remote from the arranger: the planting location data, the harvesting location data, the planting information, the harvesting information, the crop information, and the storage identifier.

23. A system for tracing a crop, the system comprising:
an agricultural machine for performing agricultural work associated with a particular crop in a defined geographic area;
a data storage device;
a data collection interface for collecting crop information regarding crop characteristics of the particular crop and a storage identifier of a storage volume for storing the particular crop; the data collection interface electronically storing the crop information in the data storage device during or after performance of the agricultural work;
a reader for reading seed or seed stock planting information originating from a seed supplier and associated with at least one of an optically readable tag, a seed package label, and a radio frequency tag during pre-planting or planting and prior to harvesting of the particular crop;
an information transfer device for facilitating transfer of an electronic data profile associated with the particular crop from the data storage device to a remote data storage remote from the data storage device associated with the agricultural machine to facilitate verification of a purchaser or a downstream user of the particular crop whether a desired attribute of the particular crop is present based on the data profile, the data profile including the collected crop information, the data profile comprising at least one of seed or seed stock planting information as the planting information and other stored crop information on crop moisture of the particular crop and a machine setting of the agricultural machine, the seed and seed stock planting information comprising at least one of source, variety, and lot number; and
a location-determining receiver adapted to be mounted to the agricultural machine to receive one or more electromagnetic signals for determining a geographic location of the receiver to facilitate collection of at least one of planting location data and harvesting location data associated with the collected crop information.

24. The system according to claim 23 further comprising:
a data input device for collecting crop information, the crop information comprising at least one of planting information, growing information, harvesting information, adjacent crop information, and weather information.

25. The system according to claim 23 wherein the information transfer device comprises a transmitter for transmitting the electronic data profile to a data management system.

26. The system according to claim 23 wherein the agricultural machine comprises a machine selected from the group consisting of a harvester, a tractor, a planter, a planting machine, a harvesting machine, a picker, mower, a combine and a thresher.

27. The system according to claim 23 further comprising:
at least one sensor adapted to be mounted to the agricultural machine to collect harvesting information including one of harvested crop information and agricultural machine component settings.

28. The system according to claim 23 wherein the data collection interface is further configured for collecting seed information and harvesting information associated with the particular crop and wherein information transfer device is arranged to transfer the collected seed information and collected harvesting information to a data processing system remotely situated from the agricultural machine.

29. The system according to claim 23 further comprising:
a container identification device for obtaining a storage identifier of at least one of a storage volume, a container, and a segregated storage bin that receives crop harvested by the agricultural machine.

30. The system as defined by claim 29 wherein the information transfer device is a wireless transmitter.

31. The system as defined by claim 23 wherein the information transfer device is a portable storage medium for storing data.

32. The system as defined by claim 23 where the location-determining receiver comprises a global positioning receiver with differential correction for guiding the agricultural machine in a generally linear manner in a series of substantially parallel rows.

33. The method according to claim 1 wherein the machine setting comprises a rotor speed of the harvesting machine.

34. The method according to claim 8 wherein the machine setting comprises a rotor speed of the harvesting machine.

35. The system according to claim 18 wherein the machine setting comprises a rotor speed of the harvesting machine.

36. The system according to claim 23 wherein the machine setting comprises a rotor speed of the harvesting machine.

* * * * *